(12) United States Patent
Proctor, Jr. et al.

(10) Patent No.: US 8,116,239 B2
(45) Date of Patent: Feb. 14, 2012

(54) USE OF A FILTERBANK IN AN ADAPTIVE ON-CHANNEL REPEATER UTILIZING ADAPTIVE ANTENNA ARRAYS

(75) Inventors: James A. Proctor, Jr., Melbourne Beach, FL (US); Kenneth M. Gainey, Satellite Beach, FL (US); James C. Otto, West Melbourne, FL (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 12/041,611

(22) Filed: Mar. 3, 2008

(65) Prior Publication Data
US 2008/0225930 A1 Sep. 18, 2008

Related U.S. Application Data

(60) Provisional application No. 60/904,368, filed on Mar. 2, 2007.

(51) Int. Cl.
*H04B 7/14* (2006.01)
*H04B 7/15* (2006.01)
*H04L 12/58* (2006.01)

(52) U.S. Cl. ........ 370/279; 370/293; 370/401; 375/211; 455/11.1

(58) Field of Classification Search .................. 455/11.1, 455/63.1, 67.11, 67.14, 226.1, 226.3; 370/200–469; 375/33–233
See application file for complete search history.

(56) References Cited

U.S. PATENT DOCUMENTS

| | | | |
|---|---|---|---|
| 4,471,357 A | 9/1984 | Wu et al. | |
| 4,776,032 A | 10/1988 | Odate et al. | |
| 5,265,150 A | 11/1993 | Helmkamp et al. | |
| 6,141,332 A | 10/2000 | Lavean | |
| 6,163,572 A | 12/2000 | Velez et al. | |
| 6,256,506 B1 | 7/2001 | Alexander, Jr. et al. | |
| 6,445,904 B1 | 9/2002 | Lovinggood et al. | |
| 6,697,603 B1 | 2/2004 | Lovinggood et al. | |

(Continued)

FOREIGN PATENT DOCUMENTS
EP 1039716 9/2000
(Continued)

OTHER PUBLICATIONS

Amihai, Koo: "Design of Multiplierless FIR Digital Filters With Two to the N th Power Coefficients" IEEE Transactions On Consumer Electronics, vol. 52, No. 3, Aug. 1987, pp. 109-114, XP011158561.

(Continued)

*Primary Examiner* — Afsar M. Qureshi
(74) *Attorney, Agent, or Firm* — Linda G. Gunderson

(57) ABSTRACT

A repeater environment is provided operative to deploy a feedback cancellation loop that is adaptively coupled with an antenna array such that a selected metric can be derived by deploying a selected filter bank operative to process the signal on a bin by bin basis and the derived metric can be applied to the antenna array and feedback cancellation loop combination to improve signal integrity and amplification. In an illustrative implementation, an exemplary repeater environment comprises, a transmitter, a receiver, an equalized feedback cancellation loop circuitry comprising a filter bank, the cancellation loop being operatively coupled to an antenna array. In the illustrative implementation, the feedback cancellation loop can receive signals as input from a cooperating antenna array and provide output signals such as a feedback leakage signal to a cooperating antenna array.

22 Claims, 17 Drawing Sheets

U.S. PATENT DOCUMENTS

| | | |
|---|---|---|
| 6,731,904 B1 | 5/2004 | Judd |
| 6,745,003 B1 | 6/2004 | Maca et al. |
| 6,785,513 B1 | 8/2004 | Sivaprakasam |
| 6,889,033 B2 | 5/2005 | Bongfeldt |
| 6,934,511 B1 * | 8/2005 | Lovinggood et al. ........ 455/11.1 |
| 6,990,313 B1 | 1/2006 | Yarkosky |
| 7,027,770 B2 * | 4/2006 | Judd et al. .................... 455/11.1 |
| 7,035,587 B1 | 4/2006 | Yarkosky |
| 7,068,973 B1 | 6/2006 | Lovinggood et al. |
| 7,088,953 B2 | 8/2006 | Bongfeldt |
| 7,130,875 B2 | 10/2006 | Abe |
| 7,263,293 B2 | 8/2007 | Ommodt et al. |
| 7,333,771 B2 | 2/2008 | Maxwell |
| 2003/0022626 A1 | 1/2003 | Miquel et al. |
| 2003/0124976 A1 | 7/2003 | Tamaki et al. |
| 2004/0001464 A1 | 1/2004 | Adkins et al. |
| 2004/0110469 A1 | 6/2004 | Judd et al. |
| 2004/0125895 A1 | 7/2004 | Buckley et al. |
| 2004/0147221 A1 | 7/2004 | Sheynblat et al. |
| 2005/0068226 A1 | 3/2005 | Shinonaga et al. |
| 2005/0190822 A1 | 9/2005 | Fujii et al. |
| 2006/0030262 A1 | 2/2006 | Anderson et al. |
| 2006/0077920 A1 | 4/2006 | Kilfoyle et al. |
| 2006/0109891 A1 | 5/2006 | Guo et al. |
| 2006/0205343 A1 | 9/2006 | Runyon et al. |
| 2006/0264174 A1 | 11/2006 | Moss |
| 2007/0041440 A1 | 2/2007 | Schoenbeck et al. |
| 2007/0109962 A1 | 5/2007 | Leng et al. |
| 2009/0239521 A1 | 9/2009 | Mohebbi |
| 2011/0002367 A1 | 1/2011 | Kummetz |

FOREIGN PATENT DOCUMENTS

| | | |
|---|---|---|
| JP | 63079429 | 4/1988 |
| JP | 1188117 | 7/1989 |
| JP | 7066775 | 3/1995 |
| JP | 2000077926 A | 3/2000 |
| JP | 2000286772 | 10/2000 |
| JP | 2000341243 A | 12/2000 |
| JP | 2001007750 A | 1/2001 |
| JP | 2001223628 A | 8/2001 |
| JP | 2001511960 | 8/2001 |
| JP | 2001285167 | 10/2001 |
| JP | 2001518739 | 10/2001 |
| JP | 2001309421 | 11/2001 |
| JP | 2002300094 | 10/2002 |
| JP | 2003060616 A | 2/2003 |
| JP | 2003087217 | 3/2003 |
| JP | 2003511894 | 3/2003 |
| JP | 2003523690 T | 8/2003 |
| JP | 2003273831 A | 9/2003 |
| JP | 2004048202 | 2/2004 |
| JP | 2004328666 | 11/2004 |
| JP | 2005039336 A | 2/2005 |
| JP | 2005223599 | 8/2005 |
| JP | 2005236626 | 9/2005 |
| JP | 2006020211 A | 1/2006 |
| JP | 2006506033 | 2/2006 |
| JP | 2006060498 | 3/2006 |
| RU | 2128886 | 4/1999 |
| SU | 961103 A1 | 9/1982 |
| SU | 987804 A1 | 1/1983 |
| SU | 1226485 A1 | 4/1986 |
| WO | WO9410779 | 5/1994 |
| WO | WO9829962 A2 | 7/1998 |
| WO | WO9917476 | 4/1999 |
| WO | WO0126248 | 4/2001 |
| WO | 02054628 | 7/2002 |
| WO | WO03093859 | 11/2003 |
| WO | WO2004045110 | 5/2004 |
| WO | WO2006011360 | 2/2006 |
| WO | WO2006099209 A2 | 9/2006 |
| WO | WO2006099525 A1 | 9/2006 |

OTHER PUBLICATIONS

Chen et al., "Transmission Filters With Multiple Flattened Passbands Based on Chirped Moire Gratings" IEEE Photonics Technology Letters, vol. 10, No. 9, Sep. 1998, XP011046212.

Macchiarella, Tamiaiio: "Design techniques for dual-Passband filters" IEEE Transactions On Microwave Theory And Techniques, vol. 53, No. 11, Nov. 2005, pp. 3265-3271, XP001512574.

Juseop Lee, Sarabandi: "Design of Triple-Passband Microwave Filters Using Frequency Transformations" IEEE Transactions On Microwave Theory And Techniques, vol. 56, No. 1, Jan. 2008, pp. 187-193, XP011198986.

Dorot, V. et al.: "An Explanatory Dictionary of Modern Computer Terms," 2nd Edition, bhv, Saint Petersburg, 2001, 'Program Product' on p. 339.

Written Opinion -PCT/US2008/055733, International Search Authority, European Patent Office, Mar. 3, 2008.

* cited by examiner

The above plot shows correlation vs offset bins for the received signal, for the significant frequency bins. The leakage correlation is at 2083, and the receive signal correlation peak is at 2085. There is above a 25 dB difference in the peak of the two correlations.

Next, a second cross correlation between the reference signal, and the output of the cancellation is performed.

Looks like the leakage is removed well. It appears that the cross correlations are removed as well, leaving a lower signal.

USE OF A FILTERBANK IN AN ADAPTIVE ON-CHANNEL REPEATER UTILIZING ADAPTIVE ANTENNA ARRAYS

CLAIM OF PRIORITY

This application claims priority to U.S. Provisional Patent Application Ser. No. 60/904,368, filed on Mar. 2, 2007, entitled, "ADAPTIVE SAME FREQUENCY REPEATER TECHNIQUES," which is herein incorporated by reference in its entirety.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in a physical layer or data link layer as defined by the Open Systems Interconnection Basic Reference Model (OSI Model).

Physical layer repeaters can be categorized into "same frequency" or "frequency translating" devices. The network architecture associated with where the repeater is going to be deployed will govern type of repeater used. If a same frequency repeater is used, this requires that the repeater receives and transmits on the same frequency concurrently. Accordingly, the repeater must achieve isolation between the receiver and transmitter using various antenna and digital/analog cancellation techniques. If a frequency translating repeater is used, the repeater receives a signal on a first frequency channel and then translates that to a second frequency channel for concurrent transmission. In this manner, isolation between the transmitter and receiver is achieved to a certain extent through frequency separation. Preferably, the antennas for receiving and transmitting as well as repeater circuitry are included within a same packaging in order to achieve manufacturing cost reductions, ease of installation, or the like. This is particularly the case when the repeater is intended for use by a consumer as a residential or small office based device where form factor and ease of installation is an important consideration. In such device, one antenna or set of antennas usually face, for example, a base station, access point, gateway, or another antenna or set of antennas facing a subscriber device.

For a repeater which receives and transmits concurrently, isolation between the receiving and transmitting antennas is a significant factor in overall repeater performance—this is the case whether repeating to the same frequency or repeating to a different frequency. More particularly, if the receiver and the transmitter antennas are not isolated properly, performance of the repeater can significantly deteriorate. Generally, gain of the repeater cannot be greater than the isolation to prevent repeater oscillation or initial de-sensitization. Isolation is generally achieved by physical separation, antenna patterns, or polarization. For frequency translating repeaters, additional isolation may be achieved utilizing band pass filtering, but antenna isolation generally remains a limiting factor in the repeater's performance due to unwanted noise and out of band emissions from the transmitter being received in the receiving antenna's in-band frequency range. The antenna isolation from the receiver to transmitter is an even more critical problem with repeaters operating on same frequencies and where band pass filtering does not provide additional isolation.

Often cellular based systems have limited licensed spectrum available and cannot make use of frequency translating repeating approaches and therefore use repeaters utilizing the same receive and transmit frequency channels.

As mentioned above, for a repeater intended for use with consumers, it would be preferable to manufacture the repeater to have a physically small form factor in order to achieve further cost reductions, ease of installation, and the like. However, small form can result in antennas disposed in close proximity, thereby exasperating the isolation problem discussed above.

Current repeaters suffer an additional significant drawback in that they are not capable of separating leakage from their own transmitters from the signal they wish to repeat. As a result, conventional repeaters typically cannot optimize system isolation and performance on real time bases resulting in poor operation or destructive effects to overall network performance. Specifically, current practices do not allow for adaptive cancellation of unwanted signals in repeater environments while allowing the repeater to operate generally. Instead, current repeater deployments offer limited cancellation loops due to cost and complexity, are discrete implementations, and generally deployed in single band systems with no sub-band filtering. Further, current deployments of interference cancellation loops assume multipath delays and suffer from excess or unmatched delay in scattered signals, changing delays in signals (e.g., Doppler), and limited cancellation for wide band signals (e.g., ICs bandwidth).

From the foregoing, it is readily apparent that there exists a need for systems and methods to overcome the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Current practices do not consider use of a filter bank to process repeater signals as part of cancellation operations. With use of a filter bank, the frequency band of a processed signal can be processed as small channels in parallel using single tap cancellers with linear algebra solutions. Parallel processing of the repeater signal promotes time and cost efficiencies that are otherwise not exploited.

The herein described systems and methods provide for a repeater environment operative to deploy a feedback cancellation loop that is adaptively coupled with an antenna array such that a selected metric can be derived by deploying a selected filter bank operative to process the signal on a bin by bin basis and the derived metric can be applied to the antenna array and feedback cancellation loop combination to improve signal integrity and amplification. In an illustrative implementation, an exemplary repeater environment comprises, a transmitter, a receiver, an equalized feedback cancellation loop circuitry comprising a filter bank, the cancellation loop being operatively coupled to an antenna array. In the illustrative implementation, the feedback cancellation loop can receive signals as input from a cooperating antenna array and provide output signals such as the desired transmit signal to a cooperating transmit antenna array.

In an illustrative operation, the feedback cancellation loop can be adapted or controlled by a metric that adapts weights to the feedback cancellation loop such that the metric can be indicative of level of transmitter signal present at a receiver and can be derived based on performing a correlation between the transmitted signal and the receiver signal. In the illustrative implementation, the metric can comprise a pre-cancellation correlation metric and a post-cancellation correlation metric. Further, the exemplary repeater can operatively maintain a delay sufficient to ensure that the transmitted signal is de-correlated with a desired receiver signal, time aligned and correlated with the feedback leakage signal. In an illustrative operation, weights provided by the metric can be provided by performing a selected linear algebra technique (e.g. minimum means squared error—MMSE) resulting in a direct calculation of the weights in a closed form in one approach.

In an illustrative operation, an exemplary repeater environment can operatively perform a method wherein the repeater transmitter leakage signal and desired receive signal are received on M number of receivers; Ns samples are stored on each of multiple receivers as M receiver time blocks from each receiver; a selected number of zeroes are appended onto each of the sets of Ns number time samples from the receivers; a selected NFFT point fast Fourier transform (FFT) is performed on each of the M zero appended receive time blocks; applying M complex spatial weight arrays of a selected length NFFT to an NFFT number of FFT bins on each of the M number of receivers; the weighted frequency bins for the receivers are combined into a composite weighted receiver frequency bin; processing all the frequency bins in parallel, the composite weighted receiver frequency bins to produce post cancellation receive frequency bins respectively; calculating update values by the parallel leakage cancellation block calculates for the feedback loop to which it cooperates based on one or more of time series of composite weighted receiver frequency bins, time series of post cancellation receive frequency bins, and the time series of delayed transmitter frequency bins; producing filtered automatic gain control output frequency bins by respectively multiplying a set of NFFT number of FFT coefficients by post cancellation receive frequency bins; calculating on a bin by bin basis in conjunction with a frequency domain filter response array to update the automatic gain control and filter coefficient array; calculating new receiver and transmitter complex spatial weights arrays for the M number of receivers and N transmitters; applying N number of selected sized FFT complex spatial transmitter weigh arrays respectively to N copies of the filtered automatic gain control output frequency bins to produce N number of weighted transmit frequency bin arrays; performing a selected size (NFFT) FFT point inverse FFT is performed on N number of weighted transmit frequency bin arrays to produce N number time domain series; performing an overlap add process on the N number of time domain series to produce N number transmit time series of Ns time samples in number; transmitting N number of transmit time domain series to one or more cooperating receivers; and receiving at the M number receivers N number repeater transmit signals to form M number of repeater transmit leakage signals that are summed with M number of desired receive signals.

In accordance with an aspect, a repeater for a wireless communication network, the repeater operative to provide feedback cancellation comprises: an antenna array comprising one or more antenna elements; and an equalized feedback cancellation loop operatively comprising a filter bank, the cancellation loop being coupled to the antenna array operates on input signals to derive and apply a metric to increase signal isolation and signal gain, wherein the metric is indicative of level of a transmitter signal present at a receiver and is derived based on a correlation between a transmitted signal and a receiver signal, and wherein the repeater has a delay that allows the transmitted signal to be de-correlated with the desired receiver signal, the transmitted signal is time aligned, and the transmitted signal is correlated with a feedback leakage signal, wherein the filter bank is operative to process a bandwidth signal to be repeated into a selected number of narrowband parallel repeater paths that are able to use a selected feedback weight in the canceller.

In accordance with yet another aspect, a method that facilitates feedback loop cancellation in a repeater environment comprises: receiving repeater transmitter leakage signal and receive signal at M number of receivers; storing the received signals as Ns number of time samples; appending the Ns time samples with zero valued samples to for a size NFFT array; performing a fast Fourier transform (FFT) on the received zero appended blocks to generate FFT bins; applying M number of complex spatial receive weights on the M number of receivers to generate weighted receiver signals on a bin by bin basis for the FFT bins; combining the weighted receiver signals to generate a composite weighted signal; producing a post-cancellation receive frequency bin for use in generating automatic gain control (AGC) output frequency bins; applying spatial weighting to the AGC output frequency bins to produce weighted transmit frequency bin arrays; performing an inverse FFT on the transmit frequency bins to produce time domain series that are transmitted to M receivers and summed at the M receivers for cancellation.

In accordance with an aspect, a computer readable medium has stored thereon computer executable instructions for performing at least the following acts: receiving repeater transmitter leakage signal and receive signal at M number of receivers; storing the received signals as Ns number of time samples; appending the Ns time samples with zero valued samples to for a size NFFT array; performing an fast Fourier transform (FFT) on the received blocks to generate FFT bins; applying M number of complex spatial receive weights on the M number of receivers to generate weighted receiver signals on a bin by bin basis for the FFT bins; combining the weighted receiver signals to generate a composite weighted signal; producing a post-cancellation receive frequency bin for use in generating automatic gain control output frequency bins; applying spatial weighting to the AGC output frequency bins to produce weighted transmit frequency bin arrays; performing an inverse FFT on the transmit frequency bins to produce time domain series that are transmitted; receiving the transmitted time domain series on M receivers and summed at the M receivers for cancellation.

In another aspect, a processor, comprising a memory having stored thereon computer executable instructions to cause the processor to performing at least the following acts: receiving repeater transmitter leakage signal and receive signal at M number of receivers; storing the received signals as Ns number of time samples; appending the Ns time samples with zero valued samples to for a size NFFT array; performing a fast Fourier transform (FFT) on the received zero appended blocks to generate FFT bins; applying M number of complex spatial receive weights on the M number of receivers to generate weighted receiver signals on a bin by bin basis for the FFT bins; combining the weighted receiver signals to generate a composite weighted signal; producing a post-cancellation receive frequency bin for use in generating automatic gain control output frequency bins; applying spatial weighting to the AGC output frequency bins to produce weighted transmit frequency bin arrays; performing an inverse FFT on the transmit frequency bins to produce time domain series, using an overlap add procedure to produce Ns time samples; receiving the transmitted time domain series on M receivers and summed at the M receivers for cancellation.

In yet another aspect, a system that facilitates feedback loop cancellation in a repeater environment comprise a means for receiving repeater transmitter leakage signal and receive signal at M number of receivers; a means for storing the received signals as Ns number of time samples; a means for performing a fast Fourier transform (FFT) on the received blocks to generate FFT bins; a means for applying M number of complex spatial receive weights on the M number of receivers to generate weighted receiver signals on a bin by bin basis for the FFT bins; a means for combining the weighted receiver signals to generate a composite weighted signal; a means for producing a post-cancellation receive frequency bin for use in generating automatic gain control output frequency bins; a means for applying spatial weighting to the AGC output frequency bins to produce weighted transmit frequency bin arrays; a means for performing an inverse FFT on the transmit frequency bins to produce time domain series; receiving the transmitted time domain series on M receivers and summed at the M receivers for cancellation.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
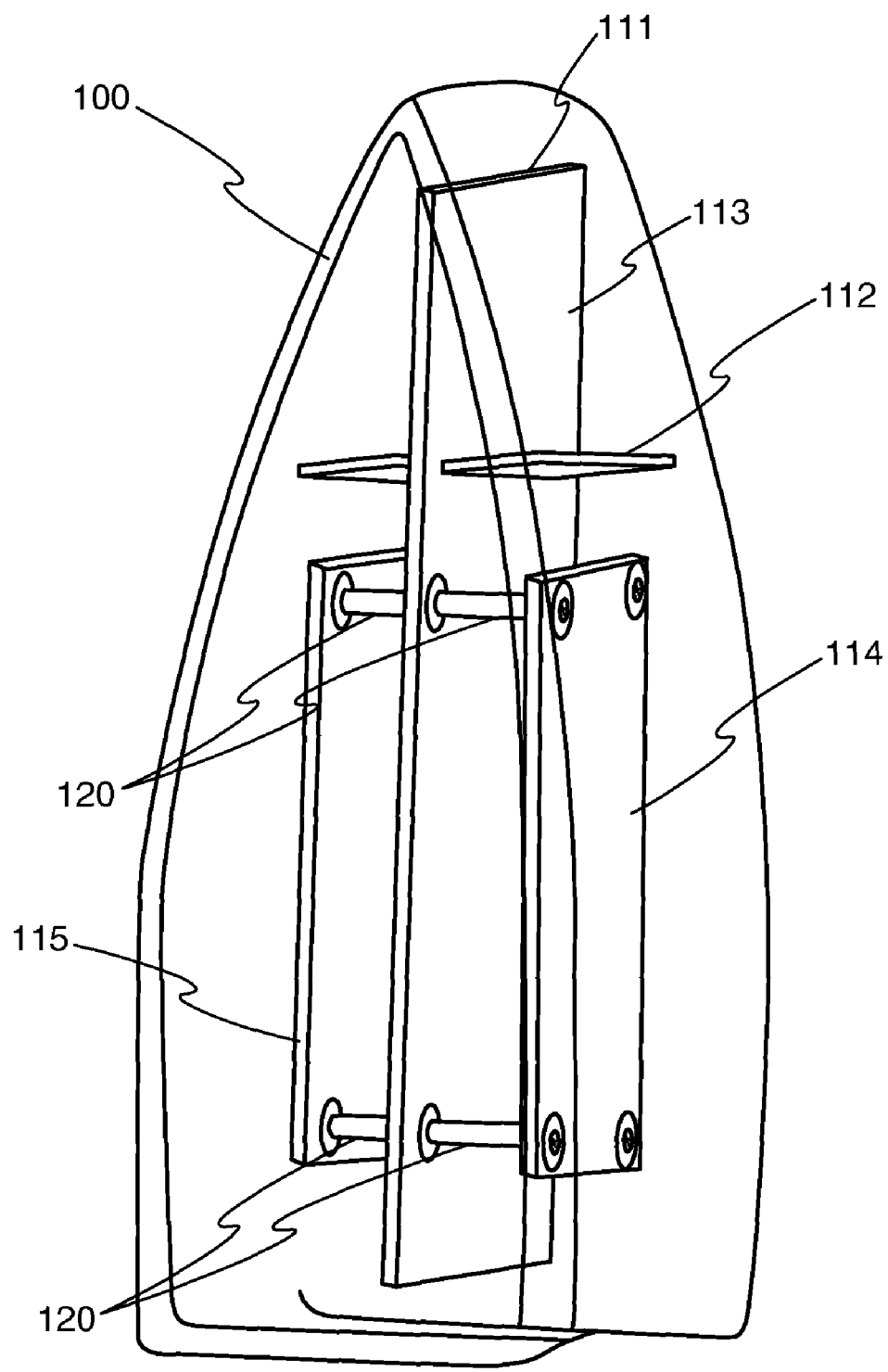
FIG. 1 is a block diagram of an exemplary enclosure of an illustrative repeater in accordance with the herein described systems and methods.

The current disclosure is related to the following U.S. Patent Application filed on Mar. 3, 2008: PHYSICAL LAYER REPEATER UTILIZING REAL TIME MEASUREMENT METRICS AND ADAPTIVE ANTENNA ARRAY TO PROMOTE SIGNAL INTEGRITY AND AMPLIFICATION, Ser. No. 12/041,598; CLOSED FORM CALCULATION OF TEMPORAL EQUALIZER WEIGHS USED IN A REPEATER TRANSMITTER LEAKAGE CANCELLATION SYSTEM, Ser No. 12/041,603; USE OF ADAPTIVE ANTENNA ARRAY IN CONJUNCTION WITH AN ON-CHANNEL REPEATER TO IMPROVE SIGNAL QUALITY, Ser. No. 12/041,615; AUTOMATIC GAIN CONTROL AND FILTERING TECHNIQUES FOR USE IN ON-CHANNEL REPEATER, Ser. No. 12/041,617; CONFIGURATION OF A REPEATER, Ser. No. 12/041,621; and SUPERIMPOSED COMPOSITE CHANNEL FILTER, Ser. No. 12/041,626, the contents of each of which are hereby incorporated by reference in their entirety.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of boosting downlink and uplink signals in a W-CDMA communications system. This invention equally applies to other standards such as CDMA-2000, as well as OFDM based systems being developed currently such as LET and UMB for example. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, UE, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" refers to various physical media capable of storing, containing, and/or carrying instruction(s) and/or data (but does not refer to vacuum). Additionally, the herein described systems and methods can be deployed as machine readable medium as part of wireless channels capable of storing, containing, and/or carrying instructions and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA), TD-SCDMA, and TD-CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used in much of the descriptions below, where appropriate.

Filter Bank Approach for Signal Cancellation in Repeater Environment:

Temporal cancellers used in repeater environments are provided in related disclosures. However, a multi tap equalizer used in the feedback loop of the canceller can provide some drawbacks since rate at which it may be adapted is dependent upon the number of time domain taps in the equalizer. While a solution that utilizes equalizer taps helps speed calculations significantly, mathematical complexity of a high number of taps can make speed of calculation or cost of implementation prohibitive for a large number of taps required for a very high degree of performance in the canceller.

With a simple equalized canceller having a low number of equalizer taps, the depth and bandwidth of cancellation are conflicting goals. Wide bandwidth signal cancellation or deeper narrow band width cancellation can be independently optimized but achieving both becomes exponentially more complex in the adaptation time, and the number of taps in the feedback loop of the canceller itself.

With some embodiments, a feedback cancellation solution can rely on calculation of a number of equalizer taps in a closed form with simplified complexity. However, it would be beneficial to use a small number of taps, preferably a single one, and cancel very deeply but in a wider bandwidth than a single tap can provide.

The herein described systems and methods may provide benefits compared to other feedback cancellation solutions by utilizing a filter bank approach that operatively provides cancellation depth of received transmitter leakage signal from a desired receive signal while providing a simplified method of calculating feedback equalizer weights in closed form.

In an illustrative implementation, a repeater environment is achieved by utilizing an FFT based filter bank approach that operatively decomposes a bandwidth signal to be repeated into a selected number of narrowband parallel repeater paths. These parallel narrowband repeater paths are able to use a single feedback weight in each canceller. Additionally, the cancellation loops can illustratively use only a single feedback weight for signal cancellation calculation, which can reduce need for calculation and inversion of a covariance matrix that can be currently required from closed form MMSE calculations. Further, the adaptive array can be optimized on a bin-by-bin basis using a least mean squared adaptive algorithm having a post cancellation correlation metric.

Further, in an illustrative implementation, the exemplary repeater environment can perform one or more operations/functions in conjunction with the filter bank approach to increase operational efficiencies including but not limited to digital filtering to allow some of the signal to pass, automatic gain control, and introducing a selected time delay to de-correlate transmit leakage signal from a desired received signal.

In an illustrative operation, to avoid the signal distortion an exemplary filter bank approach can be used where circular convolution will approximate a linear convolution. In the illustrative operation, an anti-distortion technique can be accomplished by providing a "zero pad" or appending a number of zero values onto end of a time block of data to be used in FFT block processing. A time domain impulse response of the filter function can also be zero padded to this same length and size of the FFT performed on the received block. Then in the frequency domain, these two sets of FFT results can be multiplied in parallel to perform filtering. This zero padding in the time domain prior to FFT processing can result in an interpolation in the frequency domain.

Illustratively, the guideline for approximating linear convolution from the circular convolution process inherent in the frequency domain filtering approach is that FFT size is greater than or equal to number of time domain samples being utilized plus the length of the time domain impulse response of the filter minus one. For FFTs that are performed of this size, values beyond number of time domain samples of the signal are set to zero to fill the FFT block to the proper size. The same requirement holds for the values beyond the length of the time domain impulse response samples of the filter response.

The linear convolution can be expressed by the following:

$$NFFT >= Ns + K - 1,$$

Where, NFFT is the FFT size, Ns can be the number of time samples in the block of signal samples to be processed, and where K is the number of time samples in the impulse response of the filter being used to filter the signal.

The number of zeros to be appended on to the end of the signal samples can be expressed as:

$$NFFT - Ns.$$

The number of zeros to be appended on the end of the impulse response samples can be represented as:

$$NFFT - K.$$

Linear convolution can be achieved by performing an "overlap and add" or "overlap and save" as described in, Alan V. Oppenheim, Ronald W. Schafer, John R. Buck: Discrete-Time Signal Processing, Prentice Hall, ISBN 0-13-754920-2. Assuming the size of the FFT is equal to Ns+K−1, the overlap and add approach involves, after performing the inverse FFT of the resulting (multiplied) FFT bins, taking the last NFFT−K−1 samples from the last block processed in this manner, and adding them to the first NFFT−K−1 samples of the current block. Finally, the first Ns samples from this "summed" block can be used as the time domain samples, while the last NFFT−K−1 samples are retained to be summed to the next block. This accomplishes overlapping the tail of the filter impulse from the last block into the next block to allow the linear convolution to occur as if it had been filtered in the time domain.

Exemplary Repeater:

FIG. 1 illustrates an exemplary enclosure for an illustrative repeater in accordance with various aspects described herein. A dipole dual patch antenna configuration along with repeater electronics can be efficiently housed in a compact enclosure 100 as shown in FIG. 1. Structure of the enclosure 100 can be such that it can be intuitively oriented in at least one of two ways; however, instructions can guide a user in connection with placement of the enclosure to maximize signal reception. In the exemplary dipole dual patch antenna configuration, a ground plane 113, incorporated with a printed circuit board (PCB) for the repeater electronics can be arranged between and parallel to two patch antennas 114 and 115 using, for example, standoffs 120. An isolation fence 112 can be employed to improve isolation in many instances.

Each of the patch antennas 114 and 115 can be arranged, for example, parallel to the ground plane 113 and can be printed on wiring board or the like, can be constructed of a stamped metal portion embedded in a plastic housing, or can be fabricated differently. A planar portion of the PCB associated with the ground plane 113 can include a dipole antenna 111 configured, for example, as an embedded trace on the PCB. Typically, the patch antennas 114 and 115 are vertically polarized and the dipole antenna 111 is horizontally polarized, although other embodiments can be used.

A combination of non-overlapping antenna patterns and opposite polarizations can be utilized to achieve approximately 40 dB or more of isolation between the receiving and transmitting antennas in a dual dipole dual patch antenna. Particularly, one of the transmitter and the receiver uses one of two dual switched patch antennas having vertical polarization for communication with an access point, while the other of the of the transmitter and the receiver employs the dipole antenna having horizontal polarization. This approach would be particularly applicable when the repeater is meant to repeat an indoor network signal to indoor clients. In this case, pattern of the antennas transmitting to the clients would typically need to be generally omni-directional, requiring use of the dual dipole antennas, as direction to the clients is unknown.

Figure 2:
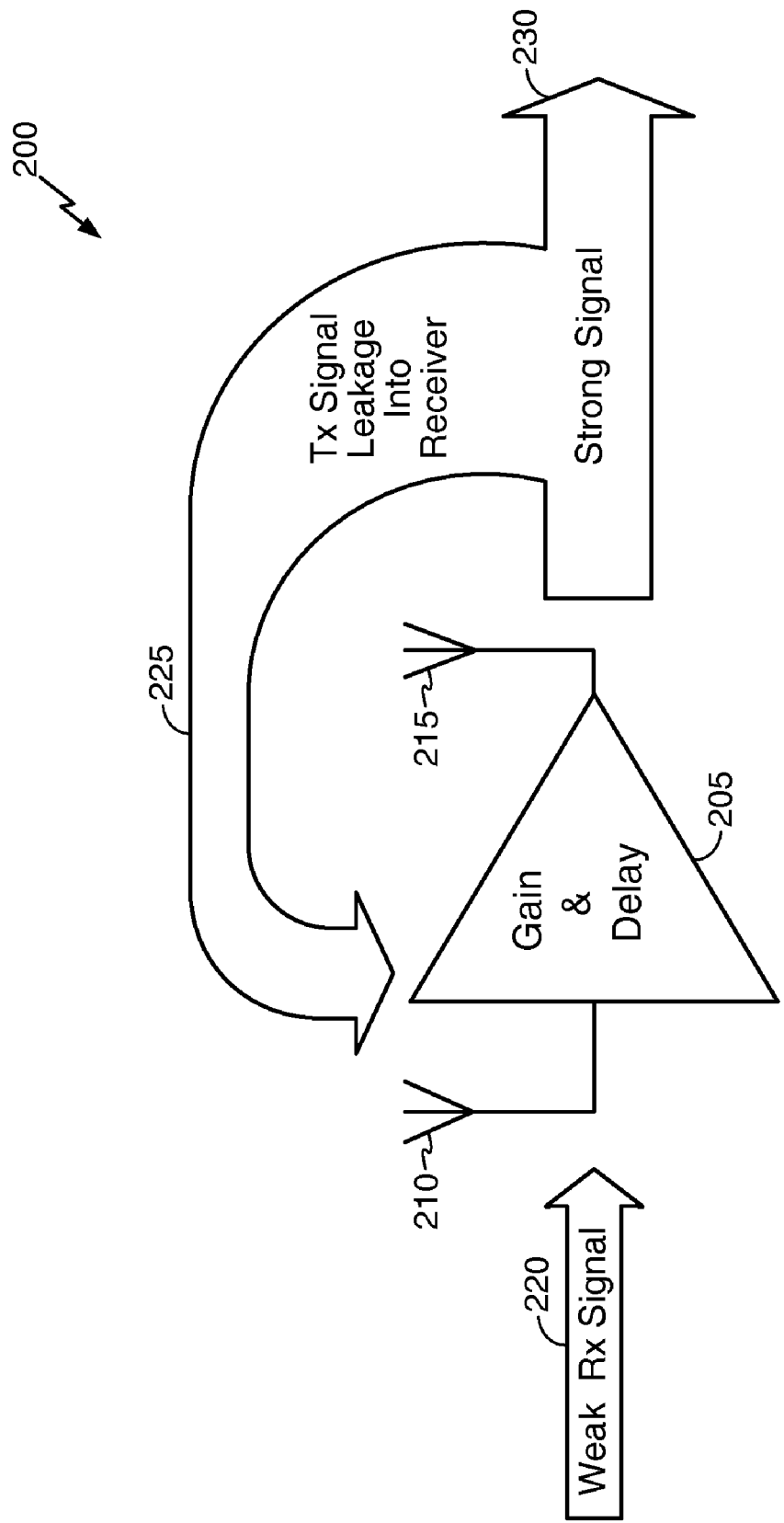
FIG. 2 is a block diagram of exemplary signal propagation for an exemplary RF repeater performing feedback cancellation in accordance with the herein described systems and methods.

FIG. 2 depicts an illustrative block diagram of an exemplary signal flow within illustrative repeater environment 200. As shown, a weak received signal (the desired received signal) 220 can be received by antenna element 210, and act as input to gain and delay component 205. Gain and delay component 205 can process the weak received signal 220 to produce strong signal 230 as an output from antenna element 215. Further, a transmit signal leakage into receiver 225 can also act as input to gain and delay 205 at antenna element 210 for use when processing the weak received signal 220 to generate strong signal 230. The transmit leakage signal into the receiver 225 can be generated by a feedback cancellation loop (not shown) operatively coupled to the antenna elements 210 and 215. That is, the feedback cancellation loop generates a signal to be transmitted by the repeater, some of which is received by receiver 225 as a transmit leakage signal.

Figure 3:
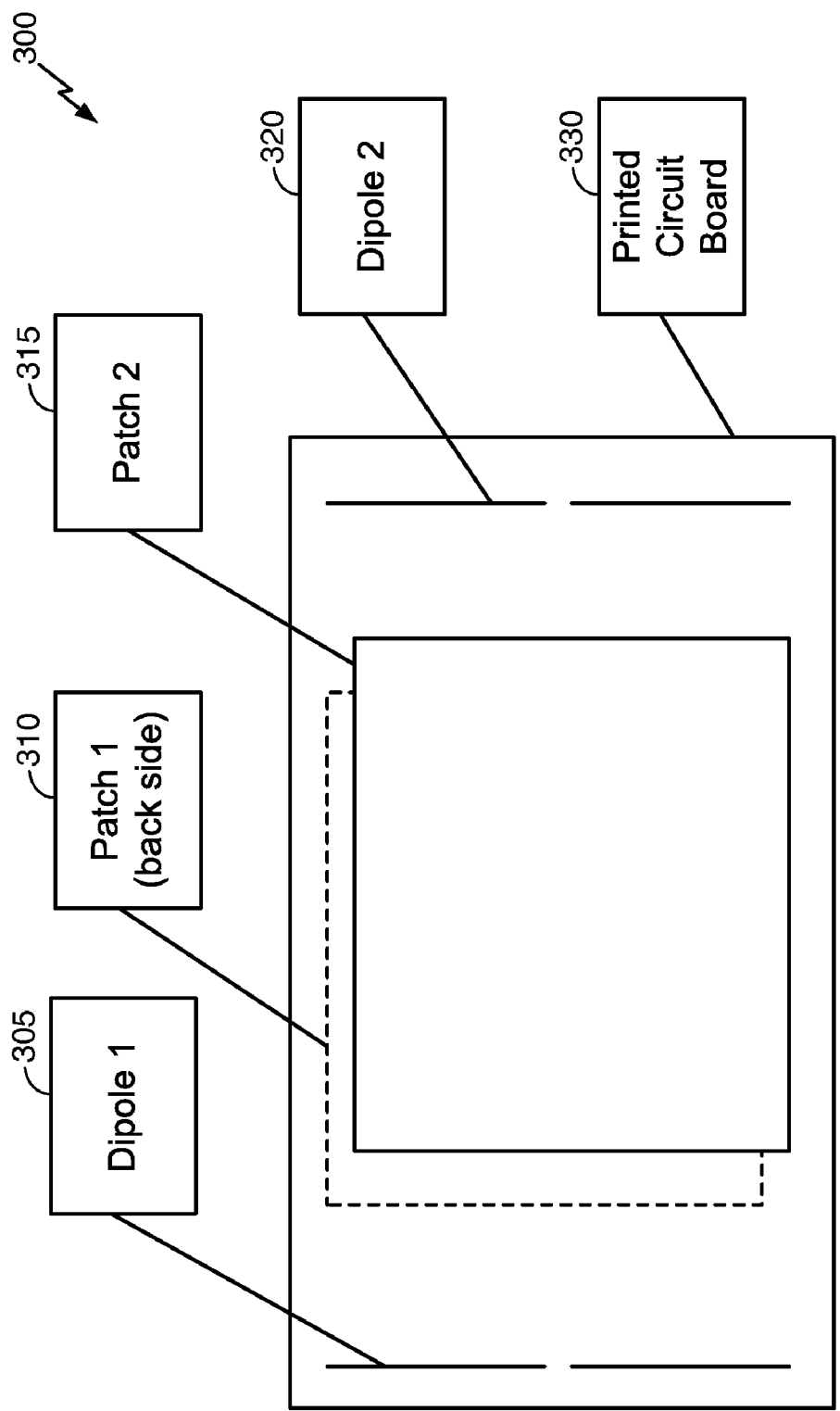
FIG. 3 is a block diagram of exemplary antenna repeater components in accordance with the herein described systems and methods.

FIG. 3 illustrates interaction of antenna elements of an exemplary repeater environment 300. Exemplary repeater environment 300 comprises printed circuit board 330 which includes dipole antennas 305 and 320, and further includes patch antennas 310 and 315. In an illustrative implementation, the dipole/patch antenna combination can achieve selected isolation between transmit and receive channels to allow for deployment of desired feedback cancellation. The antenna configuration of FIG. 3 is an example of a configuration of the antenna arrays that may be used in other embodiments described herein (where, e.g., patch antenna 310 is part of one antenna array and patch antenna 315 is part of the other antenna array).

Figure 4:
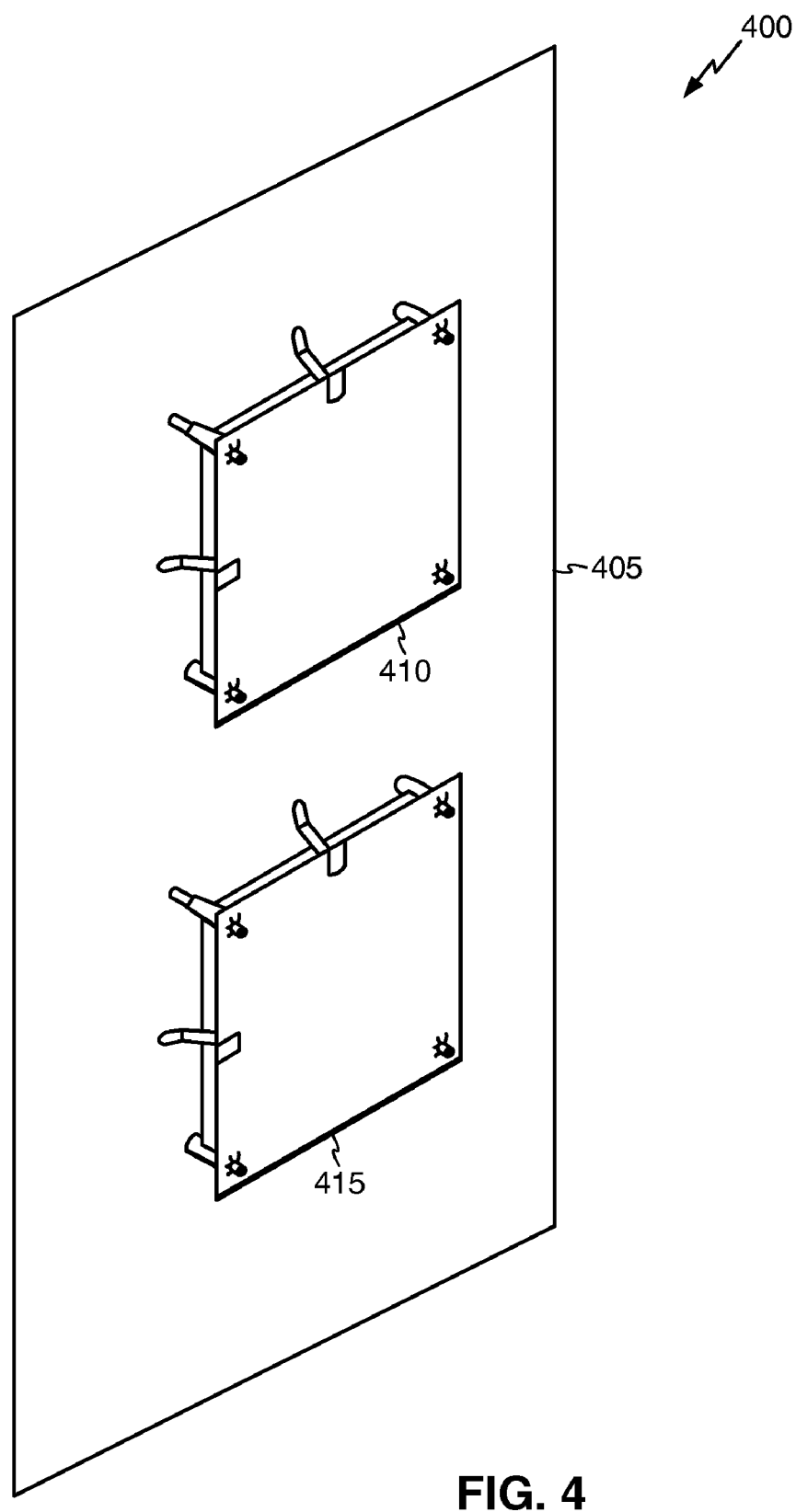
FIG. 4 is a block diagram of exemplary repeater components in accordance with the herein described systems and methods.

FIG. 4 illustrates one side of another antenna configuration for use in providing selected isolation for an exemplary repeater. Antenna configuration 400 comprises PCB board 405 having one or more patch antennas 410 and 415 mounted thereto Note that typically there would be a like number of antenna patches on the opposite side of PCB and typically orientated in an opposite or advantageous polarization when compared to the polarization of antennas 410 and 415, such that a sufficient or even maximum amount of isolation is achieved between the antennas on opposite sides of the PCB. In an illustrative implementation, PCB board 405 can comprise one or more patch antennas 410 and 415 in various configurations and have more than one pair of patch antennas as well as an uneven number of respective patch antennas that make up a superset thereof. Antenna configuration 400 can with the deployment of patch antennas 410 and 415 along with a like number of antenna on the opposite side of the PCB provide selected isolation between a transmit and receive channel (e.g., transmit channels operatively coupled to one or more patch antennae and receive channels operatively coupled to one or more patch antennae) to cooperate with isolation and amplification provided by an exemplary cooperating feedback cancellation loop (e.g., feedback cancellation loop operatively coupled to an antenna array). The configuration of FIG. 4 shows another example of antenna arrays that can be used in embodiments described herein.

Figure 5:
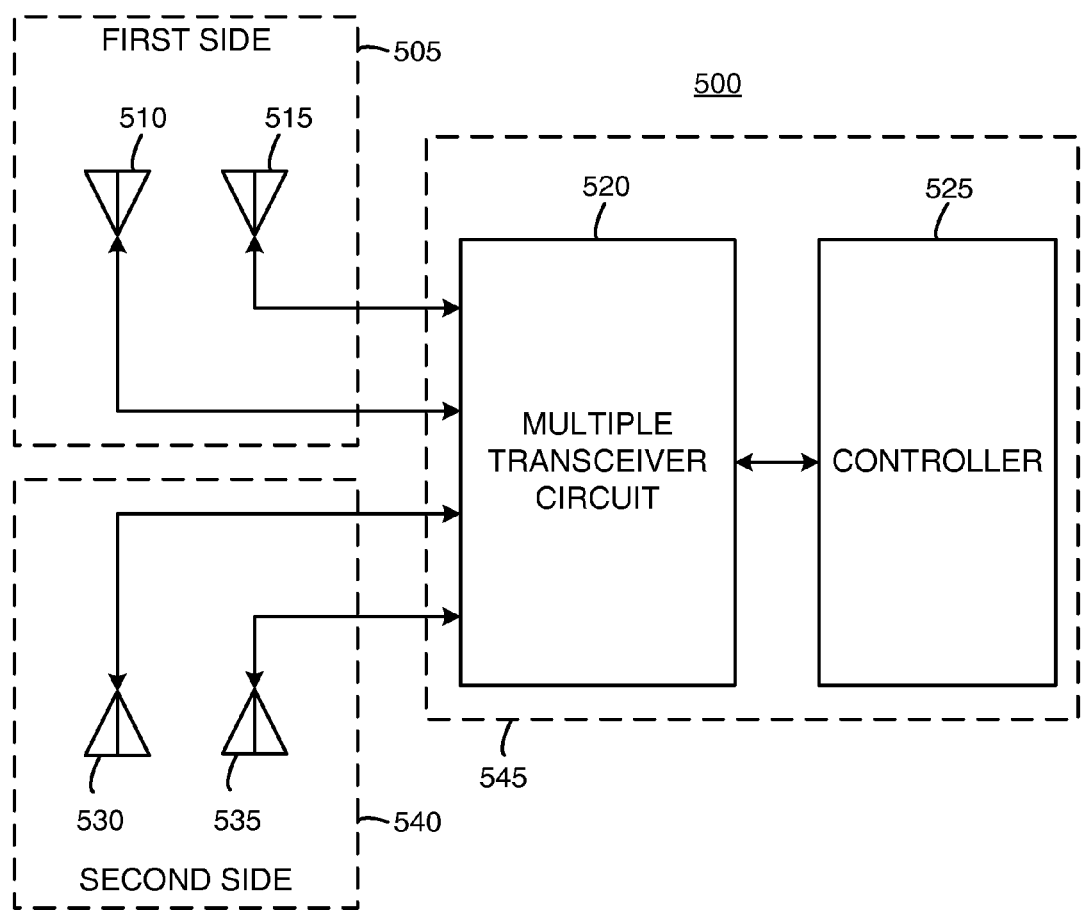
FIG. 5 is a block diagram of the cooperation of exemplary components of an illustrative RF repeater in accordance with the herein described systems and methods.

FIG. 5 shows exemplary repeater environment 500 operative to perform signal conditioning and amplification using one or more antenna arraya. Exemplary repeater environment 500 comprises a first antenna array 505 having antenna elements 510 and 515, second antenna array having antenna elements 530 and 535, processing circuitry 545 comprising multiple transceiver circuit 520 and controller 525. The antenna arrays 505 and 540 can cooperate with multiple transceiver circuit 520 which cooperates with controller 525 as part of operations of exemplary repeater environment 500. Signals can be received by antenna arrays 505 and 540 and passed to processing circuitry 545 for signal conditioning and processing and then passed back to antenna arrays 505 and 540 for communication with one or more cooperating components (e.g., base station of a CDMA wireless communications network).

In an illustrative implementation, antenna arrays 505 and 540 can comprise additional antenna elements as required to perform method(s) as described infra to achieve adaptive feedback cancellation realized by cooperation of one or more antenna arrays and the application of one or more metrics, such as one or more correlation results. Further, the number and configuration of the antenna arrays described herein are merely illustrative as the herein described systems and methods contemplate use of varying number of antenna arrays having varying configurations and comprising varying number of antenna elements.

Figure 6:
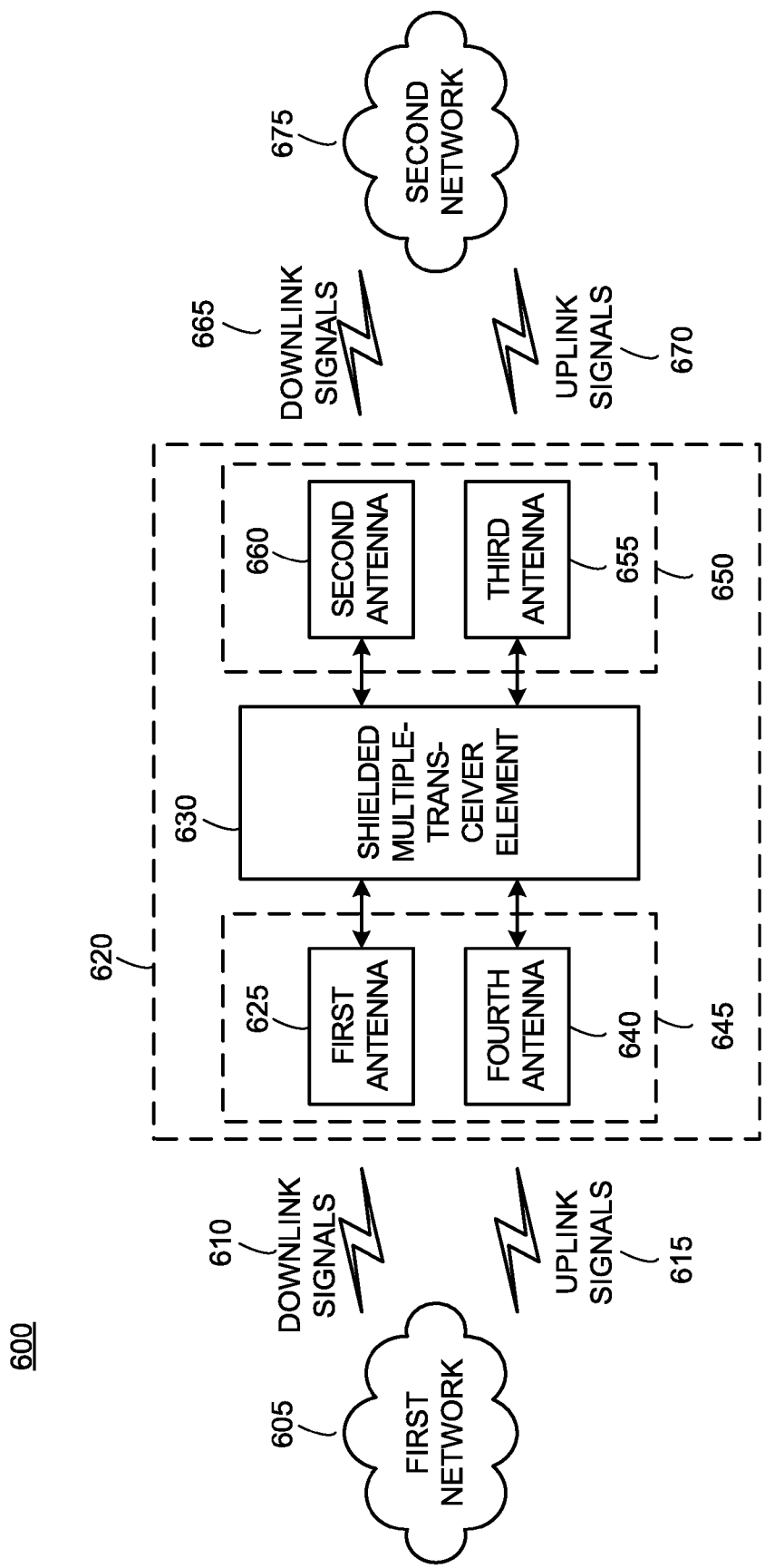
FIG. 6 is another block diagram of the cooperation of exemplary components of an illustrative RF repeater in accordance with the herein described systems and methods.

FIG. 6 illustrates interaction of exemplary repeater environment 600. Exemplary repeater environment 600 comprises processing circuitry 620 comprising antenna array 645 comprising first antenna 625 and fourth antenna 640, shielded multiple transceiver element 630, and antenna array 650 comprising second antenna element 660 and third antenna element 655. Operatively, downlink signals 610 originating from first network 605 can be processed by processing circuitry 620 to generate repeated downlink signals 665 for communication to second network 675, and uplink signals originating from second network 675 can be processed by processing circuitry 620 to generate repeated uplink signals 615 for communication to first network 605. Configuration and orientation of the antenna arrays 645 and 650 promote selected isolation of the unconditioned uplink and downlink signals provided to processing circuitry 620 and promote desired amplification and gain of such signals.

In an illustrative implementation, exemplary repeater environment 600 can comprise additional antenna elements as required to perform method(s) as described herein to achieve adaptive feedback cancellation realized by cooperation of one or more antenna arrays and the application of correlated metric. Further, it is appreciated that number and configuration of the antenna arrays described herein are merely illustrative as the herein described systems and methods contemplate use of varying number of antenna arrays having varying configurations and comprising varying number of antenna elements.

Figure 7:
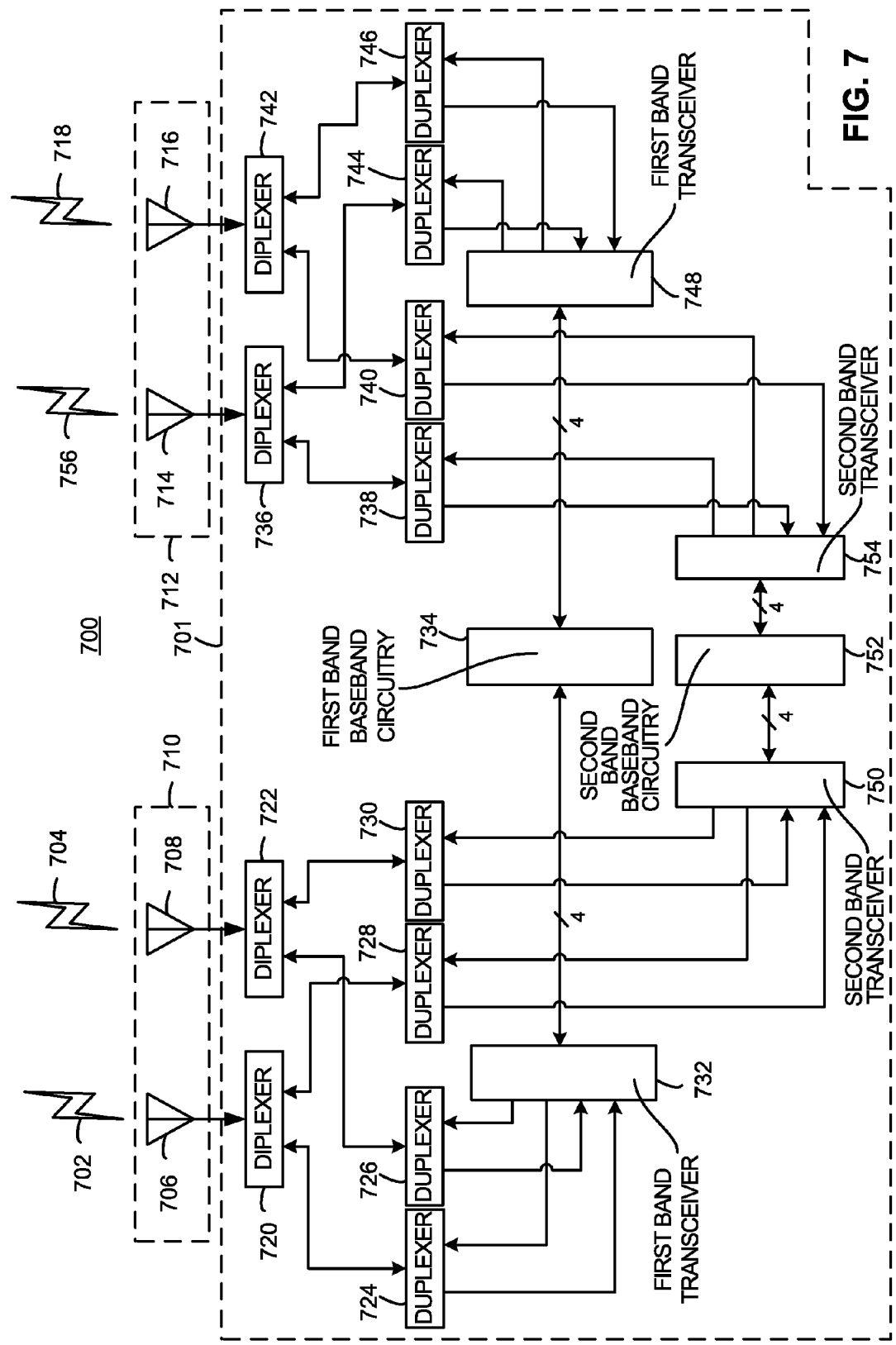
FIG. 7 is a block diagram of a frequency division duplexed (FDD) repeater having a dual band array in accordance with the herein described systems and methods.

FIG. 7 is a block diagram of a four-antenna, multiple-transceiver device 700 configured to operate in multiple bands in accordance with various illustrative implementations. This device 700 can transmit signals freely across two different bands using a variable configuration of the available antennae.

As shown in FIG. 7, the device 700 can include a shielded multiple-transceiver element 701 having a first side 710 and a second side 712. The shielded multiple-transceiver element 701 includes first band transceivers 732 and 748, first band baseband circuitry 734, second band transceivers 750 and 754, second band baseband circuitry 752, duplexers 724, 726, 728, 730, 738, 740, 744, and 746; diplexers 720, 722, 736, and 742; the first side 710 includes antennae 706 and 708; and the second side 712 includes antennae 714 and 716. Although not shown, the device 700 includes at least one electromagnetic isolation element, as described above, providing electromagnetic (EM) isolation between the antennae 706 and 708 on the first side 710, and the antennae 714 and 716 on the second side 712.

Illustratively, the antenna 706 can send or receive signals 702; the antenna 708 can send or receive signals 704; the antenna 714 can send or receive signals 756; and the antenna 716 can send or receive signals 718. These antennae 706, 708, 714, and 716 may be planar (e.g., patch) antennae, or any other desirable antenna types that may be effectively isolated from each other.

The first band transceiver 732 is connected to the antennae 706 and 708 through the duplexers 724, 726, 728, and 730, and the diplexers 720, and 722 to send or receive data via the antennae 706 and 708. The first band transceiver 748 is connected to antennae 714 and 742 through duplexers 738, 740, 744, and 746, and diplexers 736, and 742 to send or receive data via antennae 714 and 716. The first band baseband circuitry 734 is connected between first band transceiver 732 and first band transceiver 748 to provide communication between these two circuits.

The second band transceiver 750 is connected to antennae 706 and 708 through duplexers 728 and 730, and diplexers 720 and 722 to send or receive data via antennae 706 and 708. The second band transceiver 754 is connected to antennae 714 and 716 through duplexers 738 and 740, and diplexers 736 and 742 to send or receive data via antennae 714 and 716. The second band baseband circuitry 752 is connected between second band transceiver 750 and second band transceiver 754 to provide communication between these two circuits.

Diplexers 720, 722 are connected between antennae 706 and 708, and duplexers 724, 726, 728, and 730. They illustratively operate to determine which signals will be passed between antennae 706 and 708 and first band transceiver 732, and between antennae 706 and 708 and second band transceiver 750.

Diplexers 720, 722 are configured to split signals based on frequency, passing signals of a first frequency band to/from duplexers 724 and 726, and passing signals of a second frequency band to/from duplexers 728 and 730.

Duplexers 726, 728 are connected between diplexers 720, 722, and first band transceiver 732; and duplexers 728, 730 are connected between diplexers 720, 722, and second band transceiver 750. These duplexers 724, 726, 728, 730 serve to route signals of slightly different frequencies within the first or second band, respectively, to properly direct transmitted or received signals between first and second band transceivers 732 and 750 and diplexers 720, 722.

Diplexers 738, 742 are connected between antennae 714 and 716, and duplexers 738, 740, 744, and 746. They operate, for example, to determine which signals will be passed between antennae 714 and 716 and first band transceiver 748, and between antennae 714 and 716 and second band transceiver 754.

The diplexers 738, 742 are configured to split signals based on frequency, passing signals of the second frequency band to/from duplexers 738 and 740, and passing signals of the first frequency band to/from duplexers 744 and 746.

Duplexers 738, 740 are connected between diplexers 736, 742, and second band transceiver 754; and duplexers 744, 746 are connected between diplexers 736, 742, and first band transceiver 748. These duplexers 738, 740, 744, 746 serve to route signals of slightly different frequencies within the first or second band, respectively, to properly direct transmitted or received signals between first and second band transceivers 748 and 754 and diplexers 736, 742.

In alternate illustrative implementations some of duplexers 724, 726, 728, 730, 738, 740, 744, and 746, or diplexers 720, 722, 736, and 742 may be eliminated, since in some embodiments, certain permutations of band and antenna may be prohibited.

In other illustrative implementations, signals from different bands can be specifically assigned to certain transmission orientations. In such embodiments, outputs of duplexers 724, 726, 728, 730, 738, 740, 744, and 746 can be directly connected to antennae 706, 708, 714, or 716. For example, the first band could be designated to transmit/receive using a horizontal orientation, and the second band could be designated to transmit/receive using a vertical orientation.

Although the above illustrative implementations show use of only two or four antennae, along with two transceivers, this is by way of example only. Multiple-antennae, multiple-transceiver devices using different numbers of antennae or transceivers can also be used.

Furthermore, although the above illustrative implementations show antennae that are separate from a PCB, alternate embodiments could form the antennae directly on the opposite sides of the PCB. In such embodiments, insulating layers within the PCB can form the required non-conductive support members to separate the antennae from the ground plane. Also, in such embodiments the transceiver will likely be formed off of the PCB, and connected to the antennae by wiring on the PCB. This sort of integrated structure can provide for a more compact device.

Figure 8:
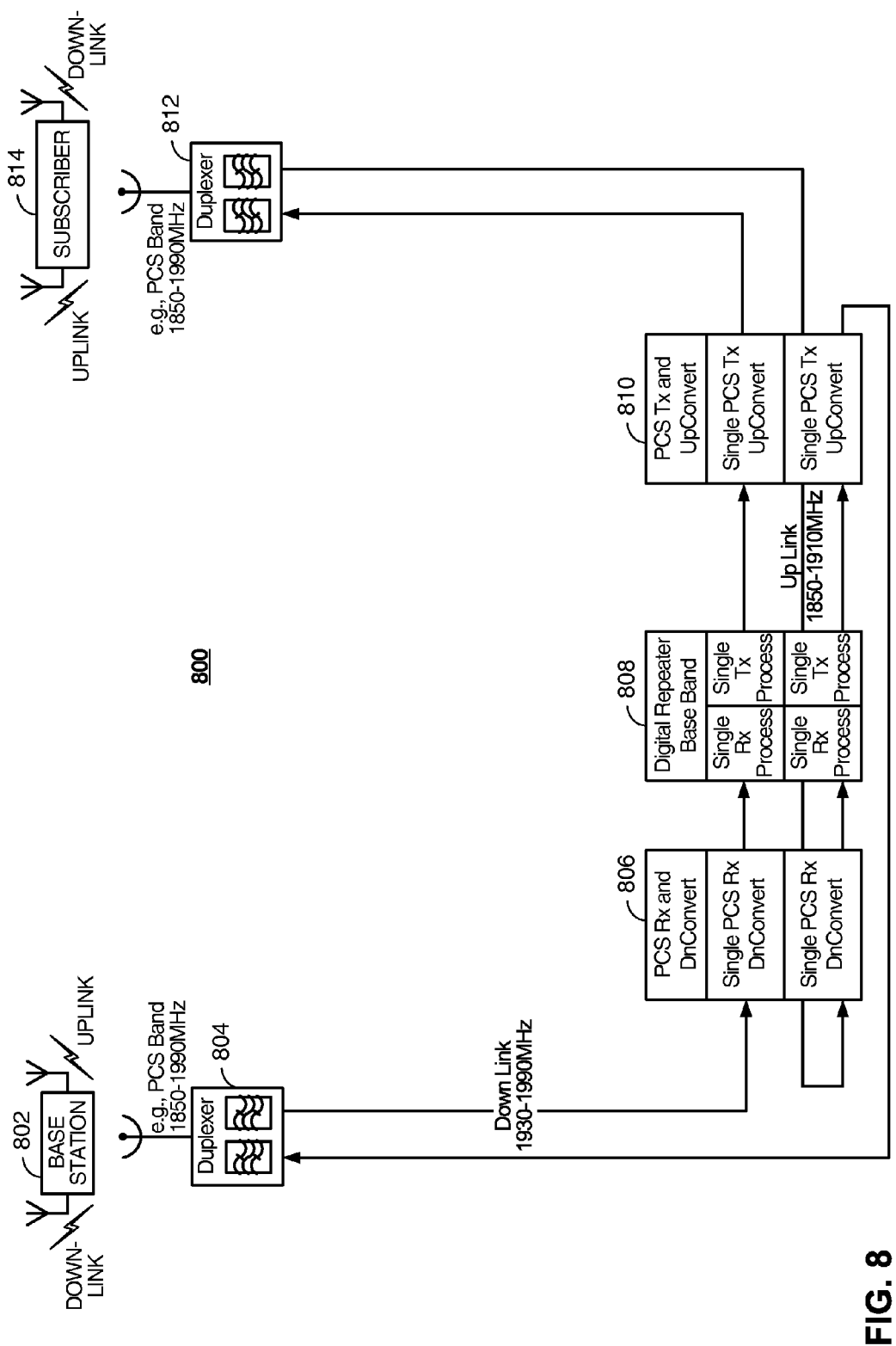
FIG. 8 is a block diagram of an exemplary FDD single band repeater having a digital interference cancellation system in accordance with the herein described systems and methods.

FIG. 8 illustrates exemplary repeater environment 800 operative to deploy an FDD single band with digital interference cancellation system in accordance with performing the exemplary method(s) described herein. As is shown, exemplary repeater environment 800 comprises duplexer 804 operatively coupled to an antenna element operative to receive signals from base station 802 and providing input signals to transceiver 806 and is operative to receive signals for processing from transceiver 8066. Further, exemplary repeater environment comprises digital repeater baseband component 808 operatively coupled to transceiver 806 and transceiver 810 which is operatively coupled to duplexer 812. In an illustrative implementation, duplexer is operatively coupled to an antenna element that allows for the communication of signals to a cooperating subscriber component 814 (e.g., mobile handset).

In an illustrative operation, as shown by the arrowed lines, the incident and transmitted signals can be processed by exemplary repeater environment 800 such that an exemplary feedback cancellation method(s) described herein.

Figure 9:
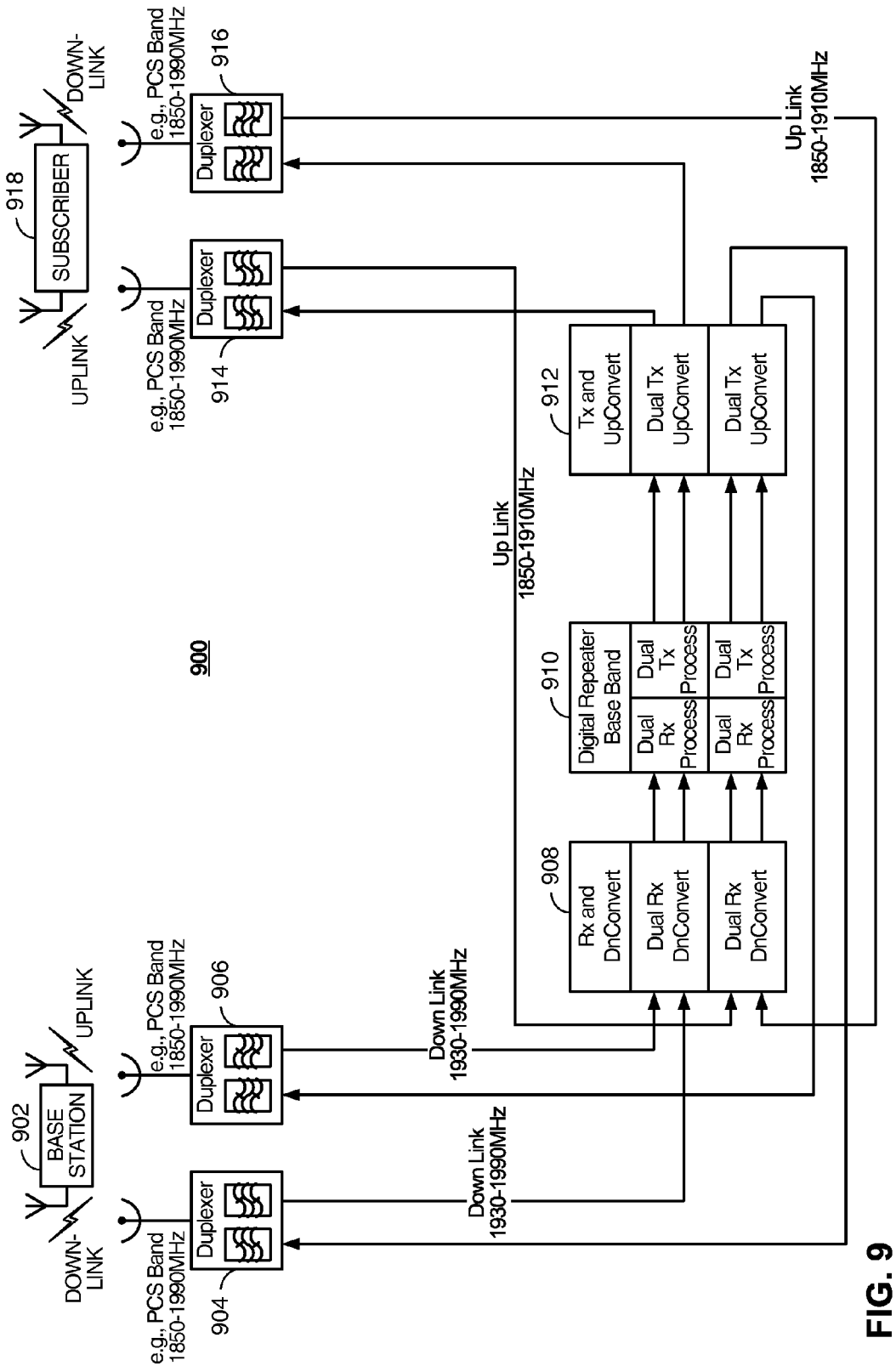
FIG. 9 is a block diagram of an exemplary FDD single band repeaters having a digital interference cancellation system and array in accordance with the herein described systems and methods.

FIG. 9 illustrates exemplary repeater environment 900 operative to deploy an FDD single band with digital interference and an antenna array in accordance with the performing the exemplary method(s) described herein. As is shown, exemplary repeater environment 900 comprises duplexers 904, 906, 914, and 916; transceivers 908 and 912; and digital repeater base band 910. Duplexers 904, 906, 914, and 96 can be operatively coupled to one or more antenna elements that can receive/transmit signals from base station 902 and subscriber component 918.

In an illustrative operation, as shown by the arrowed lines, the incident and transmitted signals can be processed by exemplary repeater environment 900 according to the exemplary feedback cancellation method(s) described herein.

Figure 10:
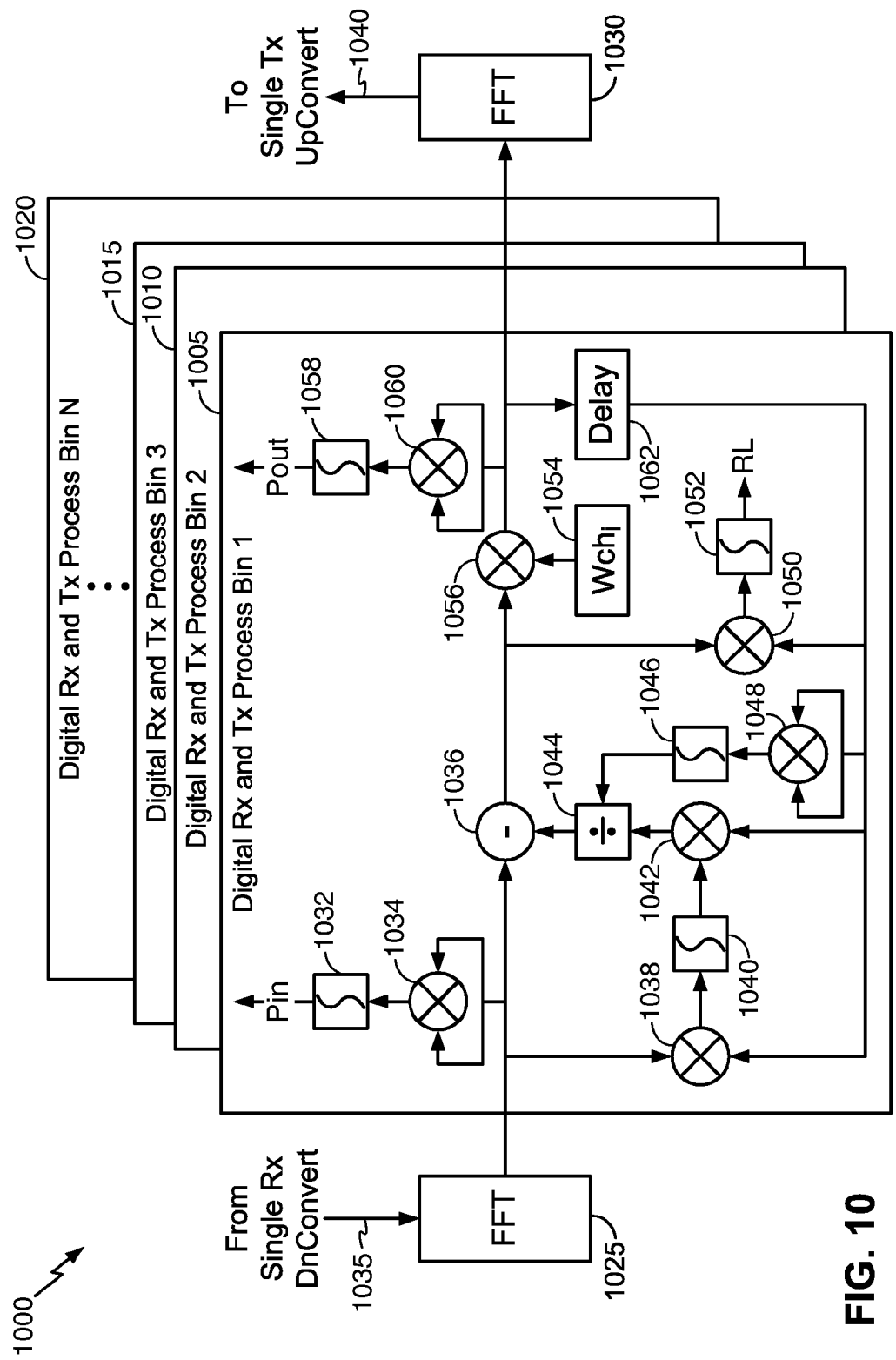
FIG. 10 is a block diagram showing the interaction of exemplary components having feedback cancellation and metric application mechanisms utilizing a filter bank approach in accordance with the herein described systems and methods.

FIG. 10 is a block diagram showing interaction of exemplary components of an illustrative repeater environment 1000 operative to perform the exemplary method(s) described in herein. As is shown, FIG. 10 shows an illustrative implementation of an exemplary repeater environment 1000 deploying weighting calculations and applying metrics as part of a feedback loop cancellation technique. Exemplary repeater environment 1000 is operative to execute one or more digital receive and transmit processes bins as described by Bin 1 1005, Bin 2 1010, Bin 3 1015, up to Bin N 1020. Further, the inputs and outputs of the digital receive and transmit process bin can comprise fast Fourier transform (FFT) modules 1025 and 1030.

In an illustrative operation, signals can be incident on antenna element 1035 for processing by repeater environment 1000. The received signal can be processed according to FFT module 1025 of one or more receive and transmit process bins Bin 1 1005 to Bin N 1020, the output of which can be passed along to the input of multiplier 1038, subtraction component 1036, and multiplier component 1034. The output of multiplier component can act as input to adder component 1032 to generate selected values for use in filter bank operations. The output of subtraction block 1036 can act as input to multiplier 1056 which takes the subtracted signal (e.g., a subtraction of the output of FFT module 1025 and division module 1044) and multiply by calculated weights from weight block 1054. The output of multiplier 1056 can act as input to multiplier 1060 the output of multiplier 1060 can act as input to summer 1058 which generates a selected value for use in filter bank operations. The output of multiplier 1054 can also act as input to delay block 1062 that can provide a selected time delay to the processed signal according to one or more filter bank operations.

The output of delay block 1062 can act as input to multiplier 1038 that multiplies the time delay with the output of FFT module 1025. The output of multiplier block 1038 can act as input to adder block 1040, the output of adder block 1040 acting as input to multiplier block 1042 operative to multiply the time delay from delay block 1062 with the output of adder block 1040. The output of multiplier block 1042 can act as input to division block 1044 which can divide the output of multiplier block 1042 by summer block 1046, the output of division block 1044 can act as input to subtraction block 1036. Additionally, as is shown, the output of delay block 1062 can act as input to multiplier 1050 which can multiply the time delay from delay block 1062 with the output of subtraction block 1036. The output of multiplier block 1050 can act as input of adder block 1052 that generates selected values for filter bank operations. Further, the output of delay block 1062 can act as input to multiplier 1048 which multiplies the delay block output with itself. The output of multiplier block 1048 can act as input to adder block 1046, the output of adder block 1046 can act as input to division block 1044. Additionally, the output of multiplier block 1056 can act as input to FFT block 1030 that can perform one or more inverse FFT operations. The output of FFT block 1030 can be communicated to one or more cooperating components (e.g., subscriber module) using antenna element 1040.

Figure 11:
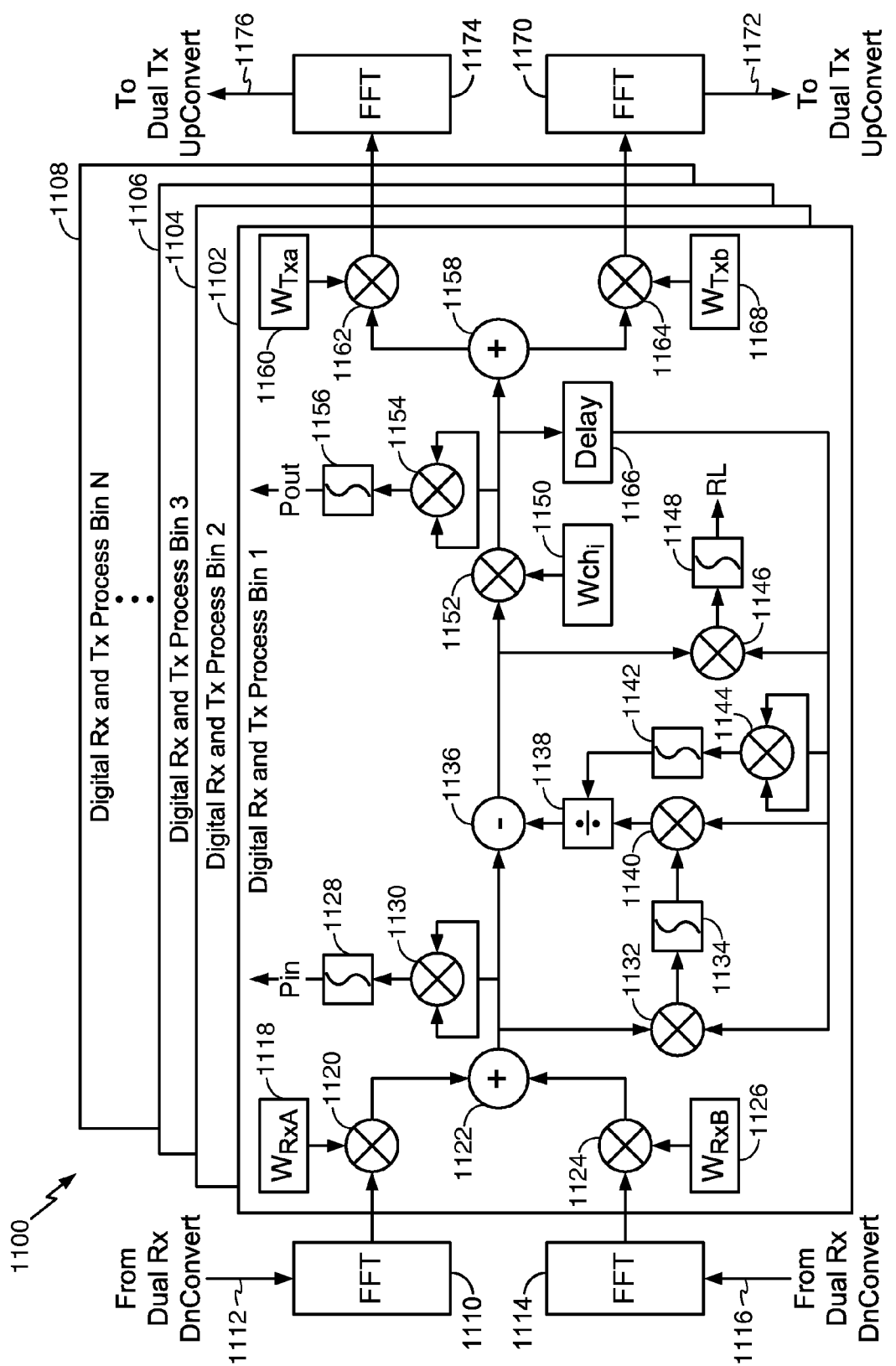
FIG. 11 is a block diagram showing the interaction of exemplary components having feedback cancellation and metric application mechanisms utilizing a filter bank approach cooperating with an antenna array adaptively in accordance with the herein described systems and methods.

FIG. 11 is a block diagram showing the interaction of exemplary components and exemplary signal pathways to perform the exemplary methods described herein as performed by exemplary repeater environment 1100. A signal can received on one of antenna elements 1112 and 1116 can be processed by FFT modules 1110 or 1114, respectively. Additionally, at the output of exemplary repeater environment 1100, antenna elements 1176 and 1172 can cooperate with FFT modules 1174 and 1170, respectively. In an illustrative implementation, the multiple antenna elements 1112 and 1116 (as well as 1176 and 1172) can comprise an adaptive antenna array operable to cooperate with receive and transmit process bins Bin 1 1102, Bin 2 1104, Bin 3 1106, up to process Bin N 1108. Illustratively, the process bins can represent parallel processing of an incident signal using a filter bank approach such that that a wide band incident signal can be decomposed into one or more narrow band blocks which are processed in the frequency domain according to the processing components described in each of the exemplary processing bins Bin 1 1102, Bin 2 1104, Bin 3 1106, up to Bin N 1008 and signal pathways amongst the processing components as shown by the arrowed lines.

Illustratively, the processing components can comprise weight blocks 1118, 1168, 1160; multipliers 1120, 1130, 1124, 1132, 1140, 1144, 1146, 1152, 1154, 1164, and 1162; adder blocks 1128, 1134, 1148, 1142 and 1156. Also present among the processing components are division block 1138, subtraction block 1136, and summer blocks 1122, and 1158. The illustrative processing components cooperate as shown by the arrowed lines to perform one or more method for the execution of filter bank approach in promoting signal cancellation between the transmitter components and receiver components of exemplary repeater environment 1100.

Figure 12:
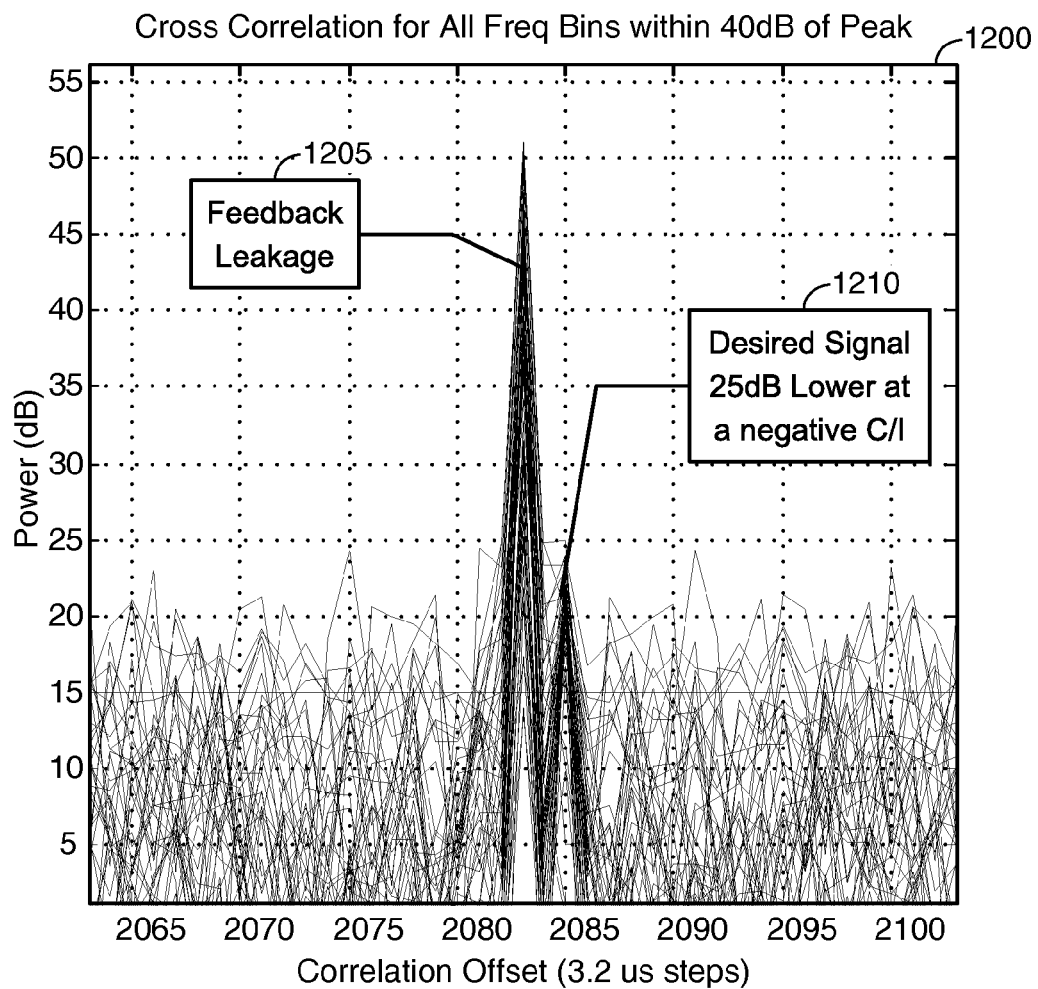
FIG. 12 is a graph diagram showing the impact of exemplary deployed feedback cancellation and metric application mechanisms in accordance with the herein described systems and methods.

FIG. 12 is graphical diagram showing the cross correlation of a plurality of frequency receive and transmit processing bins (e.g., as shown in FIGS. 10 and 11 and described in the associated text). As is shown by graphical plot 1200, the feedback leakage 1205 spikes in relation to the desired signal 1210, rendering the desired signal drowned by the feedback leakage signal (e.g., signal leaking from the transmit side back to the receiver of an exemplary repeater). Illustratively, the power of the feedback leakage signal 1205 is around 50 dB where the desired signal is 1210 shown to have a power level of 25 dB. The difference between the feedback leakage signal 1205 and the desired signal 1210 can significantly impact the performance of the exemplary repeater.

Figure 13:
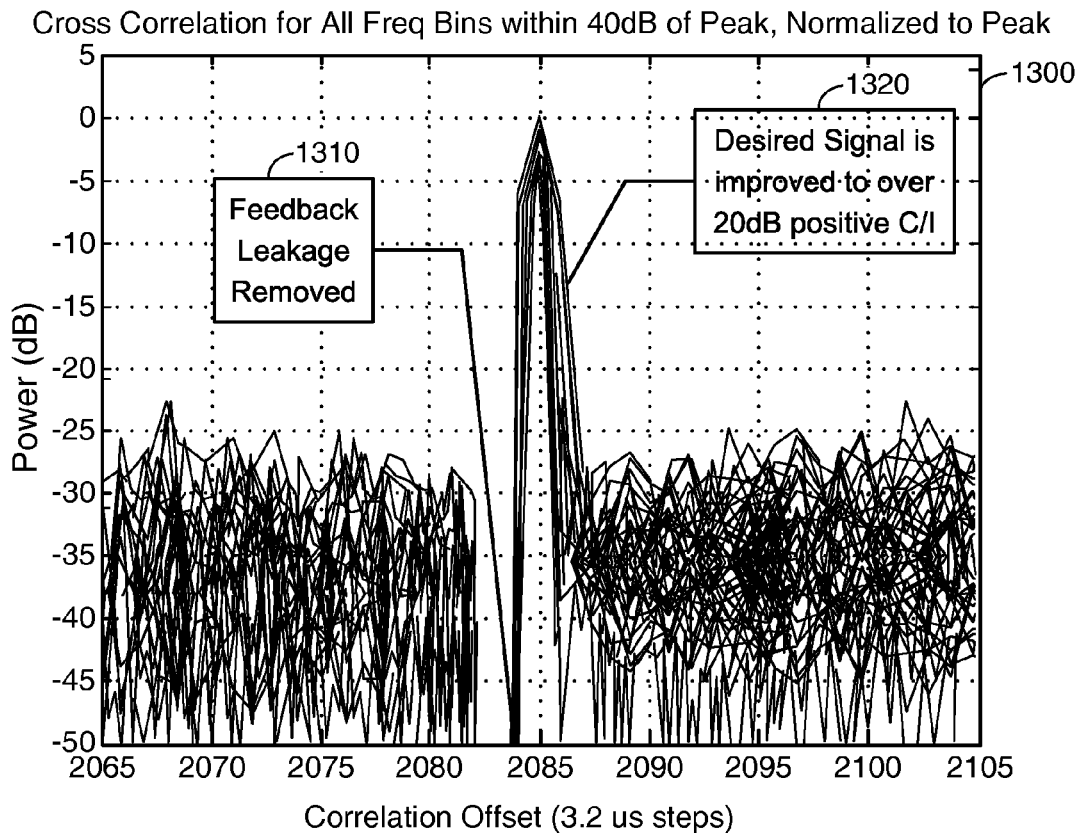
FIG. 13 is another graph diagram showing the impact of exemplary deployed feedback cancellation and metric application mechanisms in accordance with the herein described systems and methods.

FIG. 13 is a graphical diagram showing a graph plot of the performance gain realized with the application of an exemplary filter bank approach in reducing the impact of the feedback cancellation signal on an exemplary repeater environment. As is shown, in graphical plot 1300, the feedback leakage signal is removed as shown by feedback leakage removed box 1310. Additionally, the desired signal 1320 is shown to have a performance improvement of over 20 dB with the application of the filter bank feedback cancellation processing techniques described herein.

Figure 14:
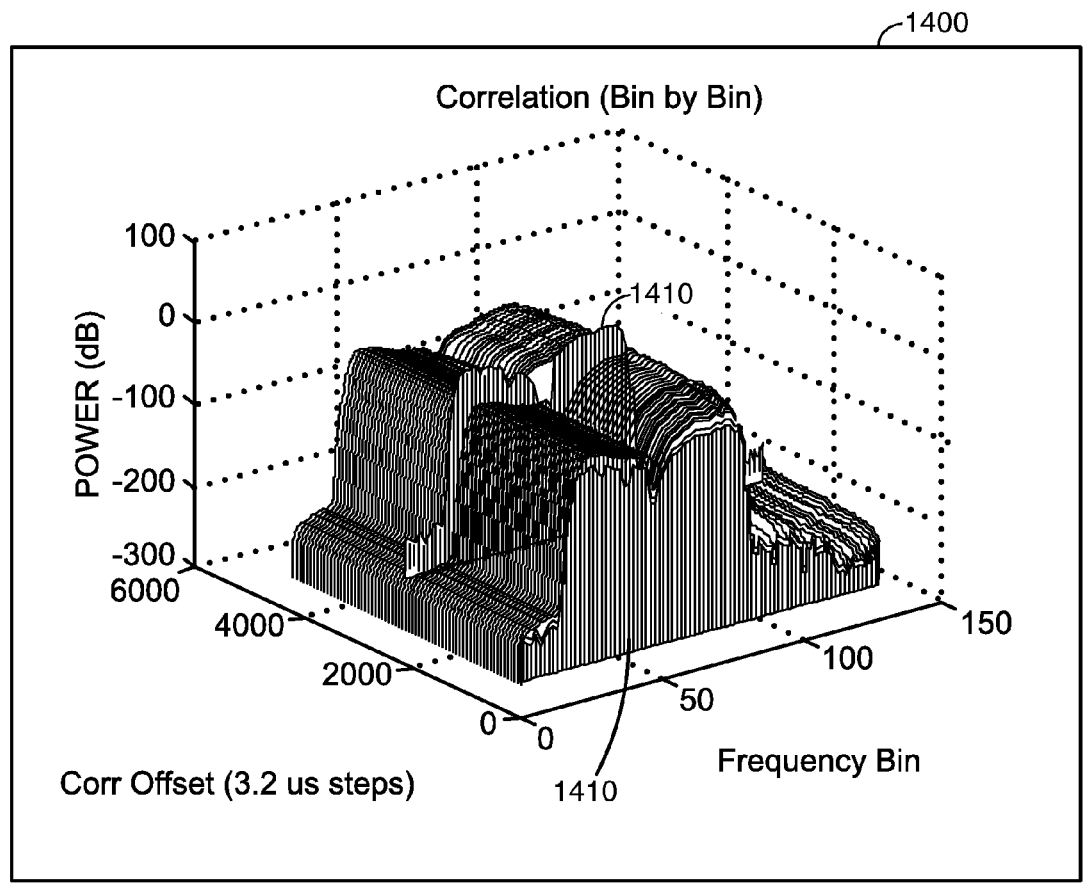
FIG. 14 is another graph diagram showing the impact of exemplary deployed feedback cancellation and metric application mechanisms in accordance with the herein described systems and methods.

FIG. 14 is a three dimensional graphical diagram showing a graph plot of the processing performed by N number of processing bins (X axis) as performed in parallel. As is shown in graphical plot 1400 an input signal 1410 can be discretely decomposed and processed in parallel bins according to the filter bank approach described herein. The decomposed signal (e.g., broken down into discrete narrow bands) can be correlated (Y axis) as is shown in FIG. 14 such that the desired signal 1410 can be processed and supported to realize performance improvement (e.g., power improvement—Z axis). The peak of the correlation at point 1410 shows the specific correlation maximum between the reference transmit signal and the received desired signal summed with the transmitted leakage signal. FIG. 12 shows the side view on the correlation offset axis. The peak correlation is aligned with point 1205 on FIG. 12.

Figure 15:
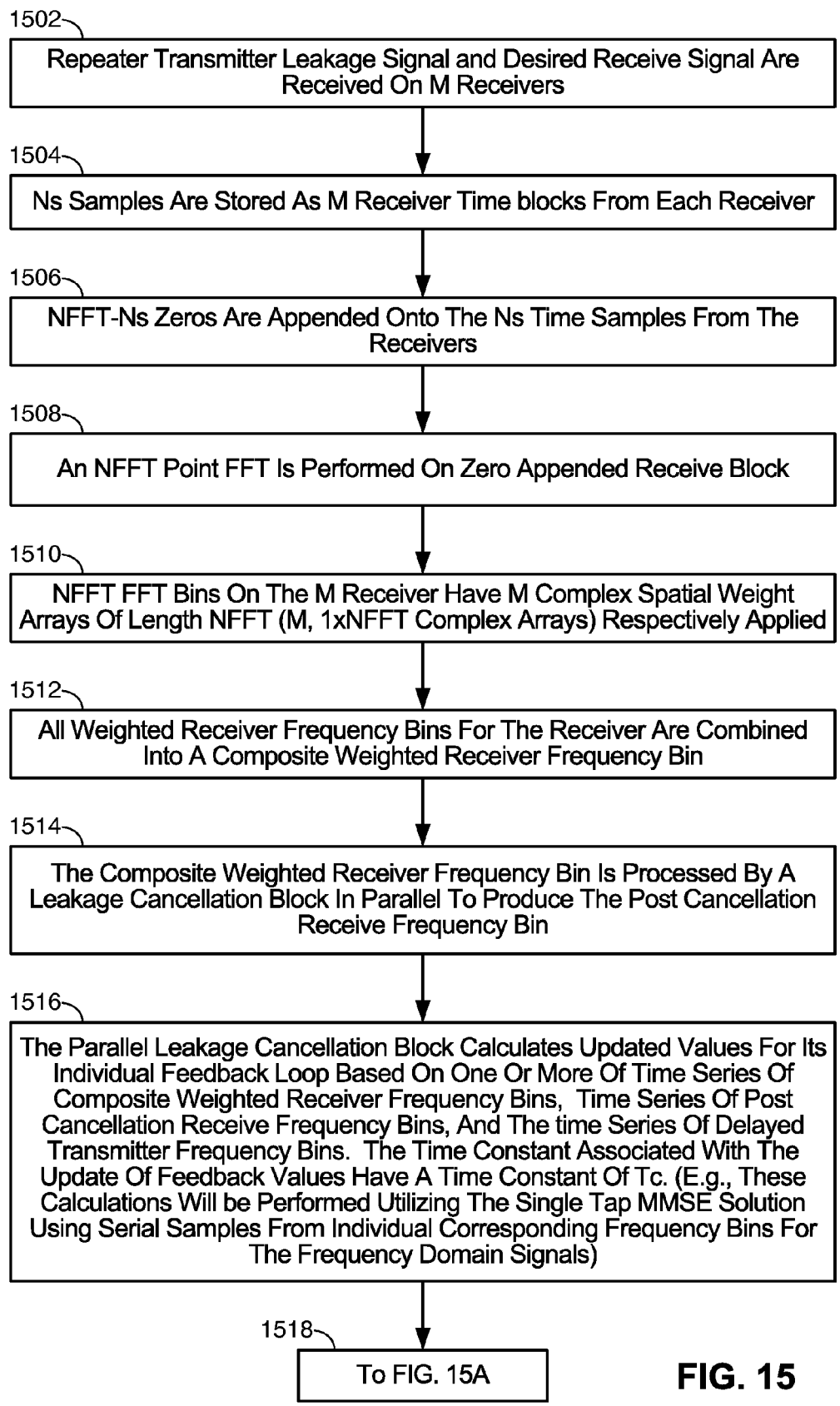
FIGS. 15 and 15A are flow diagrams of an exemplary method performed when deploying a filter bank approach to improve signal cancellation.

FIG. 15 is a flow diagram of exemplary processing performed in the application of a filter bank when performing feedback cancellation. Processing begins at block 1502 where repeater transmitter leakage signals and desired received signals are received on M receivers. Processing then proceeds to block 1504 where Ns number of samples are stored as M number of receiver time blocks from the receivers. Zero-padding then is applied at block 1506 where (NFFT−Ns) zeros are appended onto the Ns time samples from the receivers. An NFFT point FFT is then performed on the zero appended receive block at block 1508. Complex spatial weights arrays of length NFFT (e.g., M, 1×NFFT complex arrays) are applied on the NFFT bins on the M receiver at block 1510. Processing then proceeds to block 1512 where the weighted receiver frequency bins for the receiver are combined into a set of composite weighted receiver frequency bins. The composite weighted receiver frequency bins are processed by a leakage cancellation block in parallel to produce the post cancellation receiver frequency bin at block 1514. Processing then proceeds to block 1516 where the parallel leakage cancellation block can calculate updated values for each individual feedback loop based on one or more of time series of composite weighted receiver frequency bins, time series of post cancellation receive frequency bins, and time series of delayed transmitter frequency bins. Illustratively, the time constant associated with the update of feedback values can illustratively maintain a time constant of Tc. In the illustrative implementation, the calculations of the updated values calculated by the parallel leakage cancellation block can be performed by utilizing the single tap MMSE solution using serial samples from individual corresponding frequency bins for the frequency domain signals. Processing continues to FIG. 15A as described by block 1518.

Figure 15A:
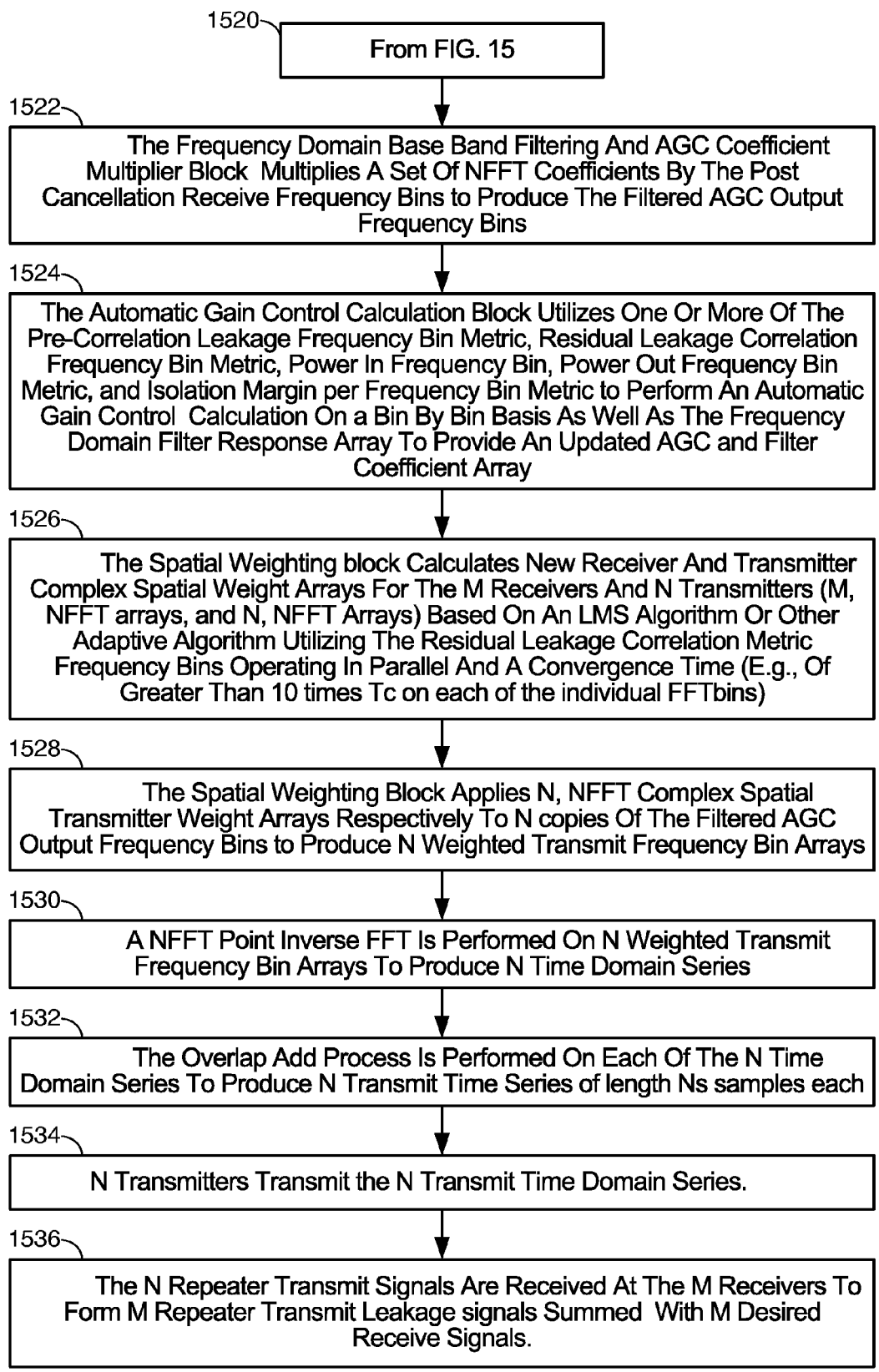

FIG. 15A is a flow diagram describing the continuation of the processing described in a FIG. 15. As is shown processing continues from block 1518 of FIG. 15 at block 1520 and proceeds. From block 1520, processing continues to block 1522 where the frequency domain base band filtering and AGC coefficient multiplier block multiplies a set of NFFT coefficients by the post cancellation receive frequency bins to produce the filtered AGC output frequency bins. Processing then proceeds to block 1524 where the automatic gain control calculation block utilized one or more of the pre-correlation leakage frequency bin metric, residual leakage correlation frequency bin metric, power in frequency bin, power out frequency bin metric, and isolation margin per frequency bin metric to perform an automatic gain control calculation on a bin by bin basis as well as the frequency domain filter response array to provide an updated AGC and filter coefficient array. Processing proceeds to block 1526 where the spatial weighting block calculates new receiver and transmitter complex spatial weights arrays for the M receivers and N transmitters (M, NFFT arrays, and N, NFFT arrays) based on an LMS algorithm or other adaptive algorithm utilizing residual leakage correlation metric frequency bins operating in parallel and a convergence time (e.g., of greater than 10 times Tc on each of the individual FFT bins). The spatial weighting block applies N, NFFT complex spatial transmitter weight arrays respectively to N copies of the Filtered AGC output frequency bins to produce N weighted transmit frequency bin arrays at block 1528. A NFFT point inverse FFT is then performed at block 1530 on N weighted transmit frequency bin arrays to produce N time domain series. Processing then proceeds to block 1532 where an overlap add process is performed on each of the N time domain series to produce N transmit time series of length Ns time samples. The N repeater transmit signals are then received at block 1536 at the M number of receivers to form M repeater transmit leakage signals summed with the M desired receive signals.

Figure 16:
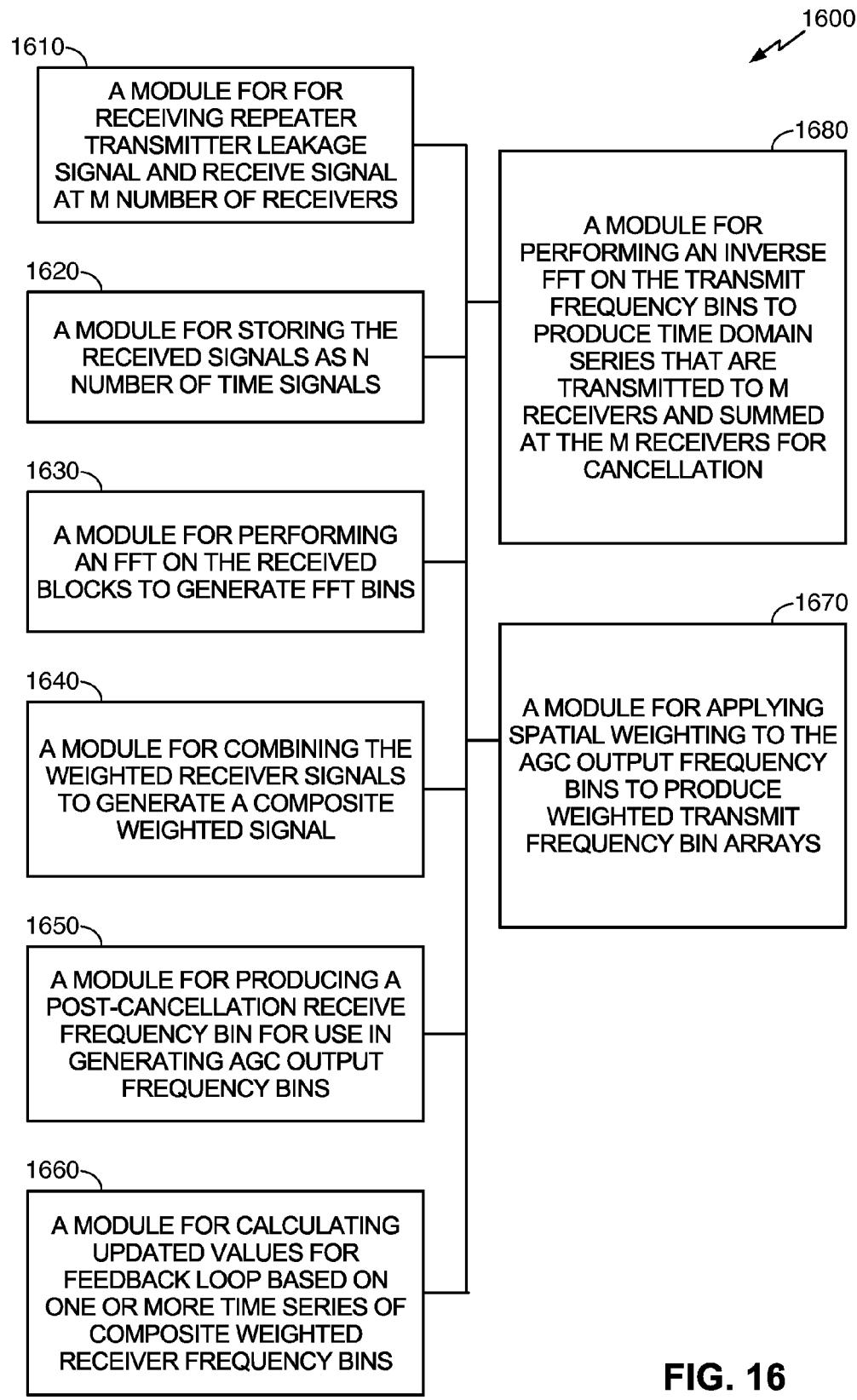
FIG. 16 illustrates an exemplary system that facilitates feedback loop cancellation in a repeater environment.

FIG. 16 illustrates a system 1600 that facilitates feedback loop cancellation in a repeater environment. The system includes a module 1610 for receiving repeater transmitter leakage signal and receive signal at M number of receivers; a module 1620 for storing the received signals as a number of the signals; a module for performing an FFT on the received blocks to generate FFT bins which will also provide the zero padding functionality; a module 1640 for combining the weighted receiver signals to generate a composite weighted signal; a module 1650 for producing a post-cancellation receive frequency bin for use in generating an automatic gain control (AGC) output frequency bins; a module 1660 for calculating updated values for feedback loop based on one or more time series of composite weighted receiver frequency bins; a module 1670 for applying spatial weighting to the AGC output frequency bins to produce weighted transmit frequency bin arrays; a module 1680 for performing an inverse FFT on the transmit frequency bins, and performing the overlap add functionality, to produce time domain series that are transmitted to M receivers and summed at the M receivers for cancellation. It is to be appreciated that a module as described herein can comprise hardware, software, or a combination thereof.

The systems and methods for efficiently representing knowledge of the herein described systems and methods may also be applied to the context of resolving in memory data on the same provider. In such context, the in memory data may not be backed by a physical store, e.g., it might be used in a graph solver on the CPU to synchronize nodes. The herein described systems and methods may also be applied in the context of scene graphs, especially as they become more distributed on multi-core architectures and calculations are written directly to an in memory data structure such as a volumetric texture.

There are multiple ways of implementing the present herein described systems and methods, e.g., an appropriate API, tool kit, driver code, operating system, control, standalone or downloadable software object, etc. which enables applications and services to use the systems and methods for representing and exchanging knowledge in accordance with the herein described systems and methods. The herein described systems and methods contemplate the use of the herein described systems and methods from the standpoint of an API (or other software object), as well as from a software or hardware object that performs the knowledge exchange in accordance with the herein described systems and methods. Thus, various implementations of the herein described systems and methods may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the herein described systems and methods have been described in connection with various computing devices and network architectures, the underlying concepts may be applied to any computing device or system in which it is desirable to synchronize data with another computing device or system. For instance, the synchronization processes of the herein described systems and methods may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the herein described systems and methods, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the herein described systems and methods. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the herein described systems and methods, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the herein described systems and methods may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the herein described systems and methods. When implemented on a general-purpose processor, the program code combines with the processor to provide a unique apparatus that operates to invoke the functionality of the herein described systems and methods. Additionally, any storage techniques used in connection with the herein described systems and methods may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the herein described systems and methods has been described in connection with the preferred embodiments of the various figures, it is to be understood that other similar embodiments may be used or modifications and additions may be made to the described embodiment for performing the same function of the herein described systems and methods without deviating therefrom. For example, while exemplary network environments of the herein described systems and methods are described in the context of a networked environment, such as a peer to peer networked environment, one skilled in the art will recognize that the herein described systems and methods are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the herein described systems and methods in the context of particular programming language constructs, the herein described systems and methods are not so limited, but rather may be implemented in any language to provide methods for representing and exchanging knowledge for a set of nodes in accordance with the herein described systems and methods. Still further, the herein described systems and methods may be implemented in or across a plurality of processing chips or devices, and storage may similarly be effected across a plurality of devices. Therefore, the herein described systems and methods should not be limited to any single embodiment, but rather should be construed in breadth and scope in accordance with the appended claims.

What is claimed is:

1. A repeater for a wireless communication network, the repeater operative to provide feedback cancellation, the repeater comprising:
   a calculation module configured to perform filter bank calculations for weights used by an equalizer, wherein N samples of the transmitter and/or receiver signal are stored as part of filter bank operations; and
   an equalized feedback cancellation loop comprising a filter bank cooperating with the calculation module to generate weights derived from one or more correlation operations to provide signal cancellation and isolation.

2. The repeater as recited in claim 1, wherein N is greater than or equal to one.

3. The repeater as recited in claim 1, wherein the filter bank cancellation calculations comprise minimum mean squared error (MMSE) calculations.

4. The repeater as recited in claim 1, further comprising one or more fast Fourier transform (FFT) modules operative to convert an input signal to the repeater from the time domain to the frequency domain.

5. The repeater as recited in claim 4, further comprising one or more FFT modules operative to transform a conditioned frequency domain signal conditioned according to one or more filter bank operations to a time domain series.

6. The repeater as recited in claim 1, wherein the repeater is a Time Division Duplex repeater and the wireless communication network is one of a Wireless-Fidelity (Wi-Fi), and Worldwide Interoperability for Microwave Access (Wi-max) network.

7. The repeater as recited in claim 1, wherein the repeater is a Frequency Division Duplex repeater and the wireless communication network is one of a cellular, Global System for Mobile communications (GSM), Code Division Multiple Access (CDMA), and ThirdGeneration (3G) network.

8. The repeater as recited in claim 1, wherein the reception and/or transmission antennas comprise at least one of dipole antennas and patch antennas.

9. The repeater as recited in claim 1, wherein the calculation module comprises digital logic to manage, control, monitor, and direct the filter bank calculations.

10. The repeater as recited in claim 1, wherein the filter bank calculations are performed by executing a linear algebra algorithm comprising minimum mean squared error (MMSE) algorithm, maximum signal-to-noise ration algorithm, and linear constrained minimum variance algorithm.

11. A method to facilitate feedback loop cancellation in a digital repeater environment comprising:
   receiving transmitter leakage signal and receive signal at M number of receivers;
   zero-padding time samples to input to a fast Fourier transform (FFT) for each of the M number of receivers;
   performing an FFT on the zero appended receive block;
   applying a M number complex spatial weight array on the M number of receivers;
   combining the weighted frequency bins into a composite signal;
   producing a post cancellation receive frequency bin;
   applying an inverse FFT on the N weighted transmit frequency bin arrays to produce N time domain series;
   transmitting N number of transmit time domain series; and
   receiving N number of repeater transmit signals at M number of receivers to form M number repeater transmit leakage signals summed with M number of received signals.

12. The method as recited in claim 11, further comprising storing Ns samples as M number of receiver time blocks from cooperating receivers.

13. The method as recited in claim 12, further comprising producing a post cancellation receive frequency bin using the composite signal.

14. The method as recited in claim 13, further comprising producing a post cancellation receive frequency bin using one or more closed form calculations.

15. The method as recited in claim 11, further comprising updating values for the feedback loop based on one or more selected values comprising time series of composite weighted receiver frequency bins, time series of post cancellation receive frequency bins, and the time series of delayed transmitter frequency bins.

16. The method as recited in claim 11, further comprising producing a filtered automatic gain control output frequency bin by multiplying coefficients by generated post cancellation receive frequency bins.

17. The method as recited in claim 11, further comprising calculating an updated automatic gain control and filter array by utilizing one or more of pre-correlation leakage frequency bin metric, residual leakage correlation frequency bin metric, power in frequency bin, power out frequency bin metric, and isolation margin per frequency bin metric to perform an automatic gain control calculation on a bin by bin basis.

18. The method as recited in claim 11, wherein a time series of AGC Filter frequency bin are multiplied by at least one coefficient derived from a correlation process and added or subtracted to the a composite receive frequency bin time series.

19. A computer readable storage medium having stored thereon a set of instructions, which when executed by a machine, cause the machine to perform acts, the acts comprising:

receiving transmitter leakage signal and receive signal at M number of receivers;

zero-padding M number of receiver time series of Ns samples as input to a fast Fourier transform (FFT) for the M number of receivers;

performing an FFT on the zero appended receive block;

applying a M number complex spatial weight array on the M number of receivers;

combining the weighted frequency bins into a composite signal;

producing a post cancellation receive frequency bin;

applying an inverse FFT on the N weighted transmit frequency bin arrays to produce N time domain series;

transmitting N number of transmit time domain series; and receiving N number of repeater transmit signals at M number of receivers to form M number repeater transmit leakage signals summed with M number of received signals.

20. A processor, comprising a memory having stored thereon computer executable instructions to cause the processor to performing at least the following acts:

receiving transmitter leakage signal and receive signal at M number of receivers;

zero-padding M number of receiver time series of Ns samples as input to a fast Fourier transform (FFT) the M number of receivers;

performing an FFT on the zero appended receive block;

applying a M number complex spatial weight array on the M number of receivers;

combining the weighted frequency bins into a composite signal;

producing a post cancellation receive frequency bin;

applying an inverse FFT on the N weighted transmit frequency bin arrays to produce N time domain series;

transmitting N number of transmit time domain series; and receiving N number of repeater transmit signals at M number of receivers to form M number repeater transmit leakage signals summed with M number of received signals.

21. A system that facilitates feedback loop cancellation in a repeater environment comprising:

means for receiving transmitter leakage signal and receive signal at M number of receivers;

means for performing an FFT on the zero appended receive block;

means for applying a M number complex spatial weight array on the M number of receivers;

means for combining the weighted frequency bins into a composite signal;

means for producing a post cancellation receive frequency bin;

means for applying an inverse FFT on the N weighted transmit frequency bin arrays to produce N time domain series;

means for transmitting N number of transmit time domain series; and means for receiving N number of repeater transmit signals at M number of receivers to form M number repeater transmit leakage signals summed with M number of received signals.

22. A repeater for a wireless communication network, the repeater operative to provide feedback cancellation, the repeater comprising:

means for performing filter bank calculations for weights used by an equalizer, wherein samples of the transmitter and/or receiver signal are stored as part of closed loop calculations and the input signal is transformed to the frequency domain for filter bank calculations, wherein the input signal is decomposed into narrow bands across one or more processing bins; and means for generating weights for use in one or more correlation operations to provide signal cancellation and isolation.

* * * * *